(12) United States Patent
Yamauchi et al.

(10) Patent No.: US 7,480,444 B2
(45) Date of Patent: *Jan. 20, 2009

(54) REPRODUCTION APPARATUS FOR CYCLICALLY CHANGING SUB-DATA

(75) Inventors: Kazuhiko Yamauchi, Neyagawa (JP); Masayuki Kozuka, Neyagawa (JP); Kazuhiro Tsuga, Takarazuka (JP); Kaoru Murase, Nara-ken (JP); Shinichi Saeki, Osaka-fu (JP); Katsuhiko Miwa, Osaka (JP)

(73) Assignee: Panasonic Corporation, Osaka (JP)

( * ) Notice: Subject to any disclaimer, the term of this patent is extended or adjusted under 35 U.S.C. 154(b) by 878 days.

This patent is subject to a terminal disclaimer.

(21) Appl. No.: 10/909,096

(22) Filed: Jul. 30, 2004

(65) Prior Publication Data

US 2005/0008338 A1    Jan. 13, 2005

Related U.S. Application Data

(62) Division of application No. 09/551,584, filed on Apr. 18, 2000, now Pat. No. 6,798,981, which is a division of application No. 08/832,436, filed on Apr. 3, 1997, now Pat. No. 6,088,507.

(30) Foreign Application Priority Data

Apr. 5, 1996   (JP) .................................. 8-083686

(51) Int. Cl.
*H04N 5/84*   (2006.01)
(52) U.S. Cl. ......................................... 386/95; 386/126
(58) Field of Classification Search .................. 386/126, 386/95, 96–99, 125, 39, 45
See application file for complete search history.

(56) References Cited

U.S. PATENT DOCUMENTS

| 4,953,035 A | 8/1990 | Yoshio |
| 5,379,276 A | 1/1995 | Igami et al. |
| 5,400,077 A | 3/1995 | Cookson et al. |
| 5,596,564 A | 1/1997 | Fukushima et al. |
| 5,630,006 A | 5/1997 | Hirayama et al. |
| 5,732,185 A | 3/1998 | Hirayama et al. |
| 5,737,303 A | 4/1998 | Stetter |
| 5,778,142 A | 7/1998 | Taira et al. |

(Continued)

FOREIGN PATENT DOCUMENTS

| CA | 2182260 | 2/1997 |
| EP | 521487 | 1/1993 |
| EP | 644692 | 3/1995 |
| EP | 677843 | 10/1995 |
| EP | 677961 | 10/1995 |

(Continued)

*Primary Examiner*—David E Harvey

(57) ABSTRACT

A multimedia optical disc is provided. The multimedia optical disc includes a data area and a management information area. The data area stores a plurality pieces of video data. The management information area stores a channel table in which a plurality of logical channel numbers are respectively related to a plurality of physical channel numbers for each piece of video data. A piece of moving picture data and a plurality pieces of sub-data are interleaved in each piece of video data. The sub-data is either of audio data and sub-picture data as still pictures. The logical channel numbers are shared by pieces of video data. The physical channel numbers are used to physically identify the plurality pieces of sub-data. With this construction, it is possible to manage sub-data even when the sub-data is dealt with by a plurality pieces of video data.

4 Claims, 37 Drawing Sheets

U.S. PATENT DOCUMENTS

| | | | |
|---|---|---|---|
| 5,870,523 A | | 2/1999 | Kikuchi et al. |
| 5,930,450 A | | 7/1999 | Fujita |
| 6,088,507 A | * | 7/2000 | Yamauchi et al. ............. 386/95 |
| 6,118,927 A | | 9/2000 | Kikuchi et al. |

FOREIGN PATENT DOCUMENTS

| | | |
|---|---|---|
| EP | 737008 | 10/1996 |
| EP | 737980 | 10/1996 |
| EP | 738078 | 10/1996 |
| EP | 746162 | 12/1996 |
| EP | 0 800 164 | 8/1997 |
| JP | 7-176175 | 7/1995 |
| JP | 8-314485 | 11/1996 |
| JP | 8-336104 | 12/1996 |
| JP | 9-51501 | 2/1997 |
| WO | 95/12179 | 5/1995 |
| WO | 95/12276 | 5/1995 |

* cited by examiner

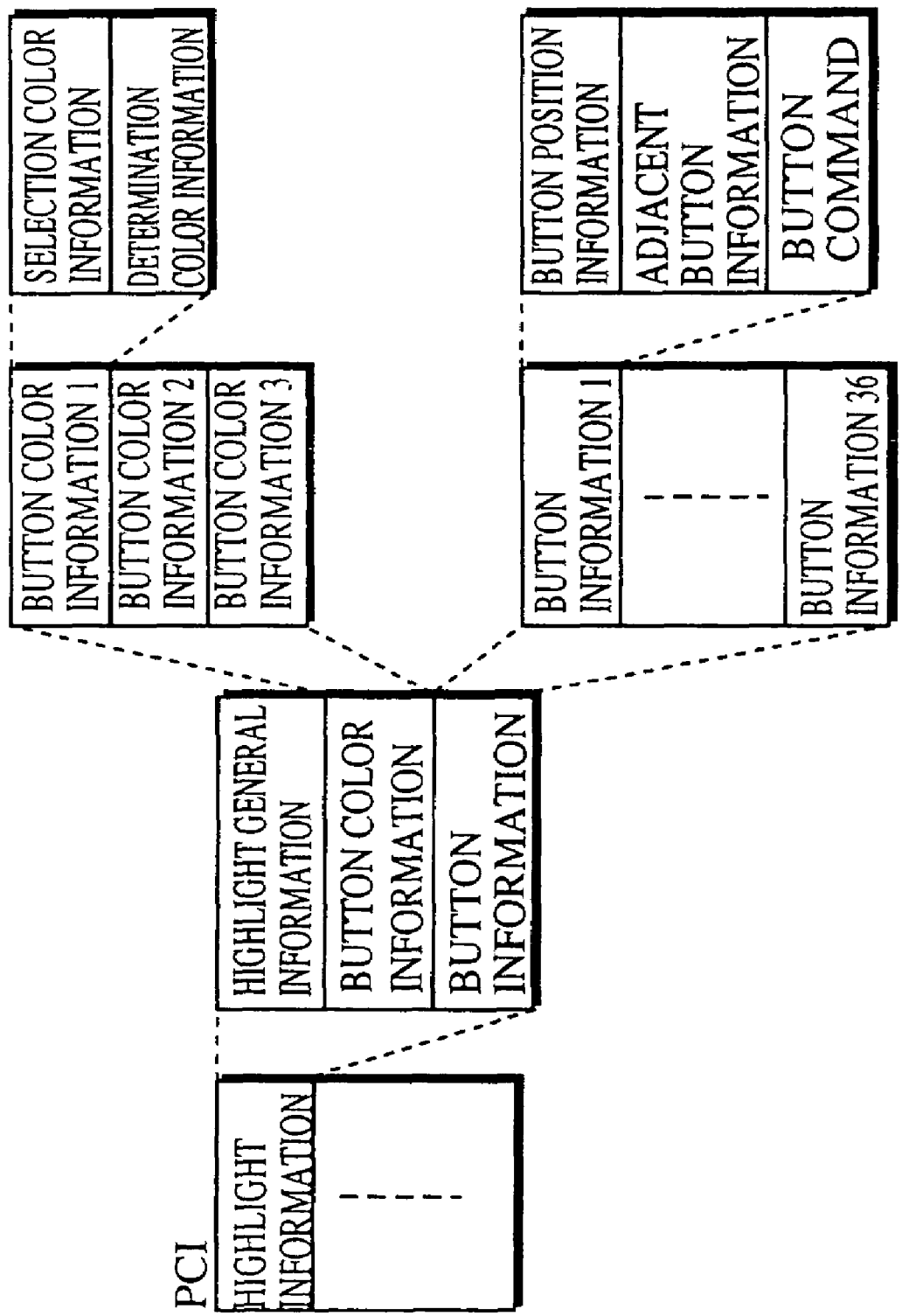

Fig. 12

| OPERATION CODE | OPERAND | OPERATION |
|---|---|---|
| SetSTN | AUDIO LOGICAL CHANNEL NO., SP LOGICAL CHANNEL NO., SP FLAG | SET AUDIO AND SP LOGICAL CHANNEL NO., WITH SP FLAG SPECIFYING WHETHER TO DISPLAY SP |
| Link | BRANCH DESTINATION PGC NO. | BRANCH TO SPECIFIED PGC |
| CmpReg Link | REGISTER NO., INTEGER, BRANCH CONDITION, BRANCH DESTINATION PGC NO. | COMPARE REGISTER WITH INTEGER, BRANCH IF CONDITION MEETS |
| SetReg Link | REGISTER NO., INTEGER, CALCULATION, BRANCH DESTINATION PGC NO. | CALCULATE WITH REGISTER VALUE AND INTEGER, THEN BRANCH |
| SetReg | REGISTER NO., INTEGER, CALCULATION | STORE CALCULATION RESULT IN REGISTER |

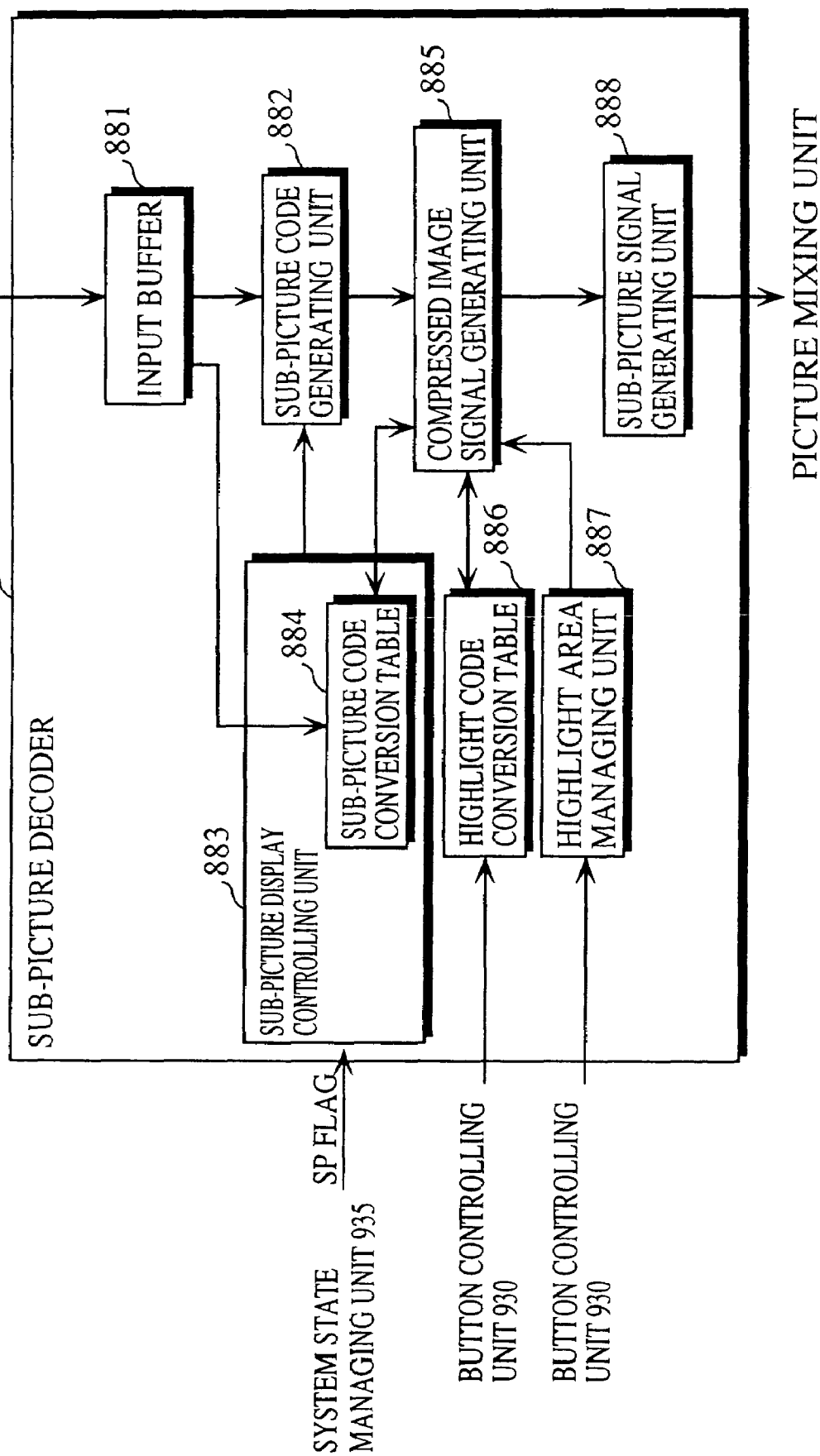

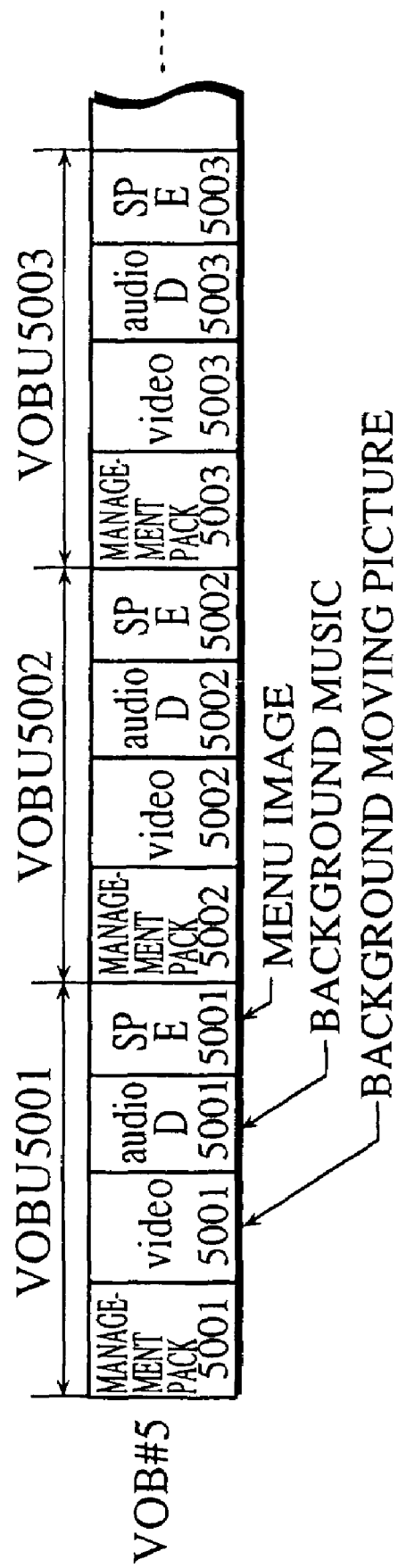

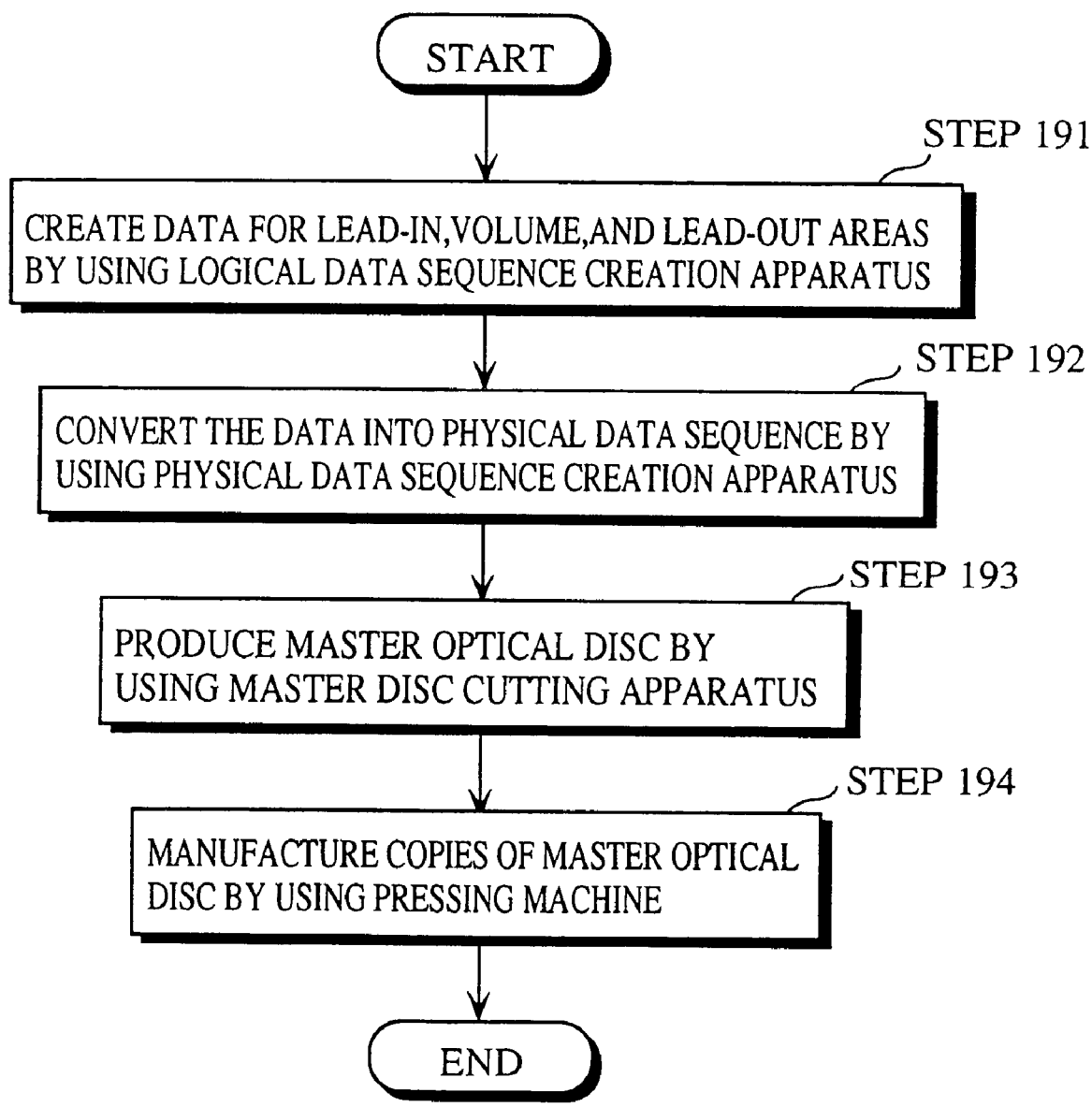

REPRODUCTION APPARATUS FOR CYCLICALLY CHANGING SUB-DATA

RELATED APPLICATIONS

This is a divisional application of U.S. Ser. No. 09/551,584, filed on Apr. 18, 2000 now U.S. Pat. No. 6,798,981; which is a divisional application of U.S. Ser. No. 08/832,436, filed on Apr. 3, 1997 now U.S. Pat. No. 6,088,507.

BACKGROUND OF THE INVENTION (1) Field of the Invention

The present invention relates to a multimedia optical disc which stores multimedia data, and to an apparatus and a method for reproducing the multimedia optical disc, more specifically to an improvement in the reproduction of movie applications.

(2) Description of the Prior Art

Currently, laser discs and video CDs (Compact Discs) are known as optical media in which audio information and moving picture information are recorded to be reproduced by dedicated apparatuses.

Laser discs are optical discs with a diameter of about 30 cm storing about an hour of analog moving picture data. Laser discs have been used as media for storing movies or music video works. However, since laser discs are bulky and hard to carry or stock, other media which are more compact than the laser discs have been sought.

Video CDs have achieved the above purpose by enabling moving picture data to be recorded on CDs. The CDs have a diameter of 12 cm and at first were used to store only audio data. The video CDs adopt a digital data compression method called MPEG (Moving Picture Experts Group) which has a high compression rate. The resolution of video CDs is as low as 352×240 though they are compact in size.

The above laser discs and video CDs, on the other hand, have the following limitation on the voice and sub-pictures. That is, since audio information is recorded in a channel, it is impossible to deal with a plurality of languages. Furthermore, the sub-picture data is recorded as a part of moving picture data and it is impossible to deal with a plurality of languages. Therefore, Japanese, English, French, and Germany versions of voices and subtitles for the same moving picture data, for example, cannot be recorded in the above conventional discs.

Different versions of a movie, for example, a theater version, a no-cut version, and a TV on-air version are available. Conventionally, it was possible to record all these versions in a video CD only if the movie was short enough to record in the disc. However, this was not possible for general movie films having 1-2 hours of reproduction time.

A laser disc can store monoaural audio data (analog or digital) in four channels at maximum along with about one hour of analog moving picture data. Laser discs are mainly used for storing movie applications. However, general movies are often about two hours long and sometimes have different versions, namely, a theater version, a TV on-air version, other language versions (voices or subtitles), etc.

It is impossible for a laser disc to store all of such versions since the recording time of the analog moving picture data is limited to about one hour. Even if a laser disc stores audio data in channels along with a plurality kinds of very short moving picture data, the following problems occur:

(1) The plurality kinds of very short moving picture data overlap each other, generating a poor recording efficiency.

(2) If a plurality of subtitles are required, as many pieces of the same moving picture data as the plurality of subtitles must be created since the subtitle is inserted in the moving picture data.

(3) It is not possible for the user to change the current subtitle to another during a reproduction of moving picture data. To reproduce the desired subtitle, the user needs to reproduce a series of moving picture data including the desired subtitle from the beginning. That is, it is not possible for the user to change only the subtitle during a reproduction of moving picture data.

(4) If plurality kinds of moving picture data have different numbers of audio channels for different languages and if a desired language is stored in a plurality of audio channels with different channel numbers, the user needs to change the audio channel number to maintain the desired language each time the user changes the moving picture data.

SUMMARY OF THE INVENTION

It is therefore an object of the present invention to provide a multimedia optical disc which may store a plurality pieces of video data, each of which is comprised of moving picture data and a plurality pieces of sub-data, such as audio data as voices and sub-picture data as subtitles, and with which the sub-data is managed easily even if different numbers of channels or different channels are assigned for the plurality pieces of video data, and to provide a disc reproduction apparatus and method for reproducing the multimedia optical disc.

The above object is achieved by a multimedia optical disc comprising: a data area for storing a plurality pieces of video data, wherein a piece of moving picture data and a plurality pieces of sub-data are interleaved in each of the plurality pieces of video data, wherein the plurality pieces of sub-data are reproduced selectively and synchronized with the piece of moving picture data, wherein the plurality pieces of sub-data are either of a plurality pieces of audio data and plurality pieces of sub-picture data; and a management information area for storing a channel table in which a plurality of logical channel numbers are respectively related to a plurality of physical channel numbers for each of the plurality pieces of video data, wherein the plurality of logical channel numbers are shared by a certain numbers of pieces of video data, wherein the plurality of physical channel numbers are used to physically identify the plurality pieces of sub-data.

In the above multimedia optical disc, the data area may include a plurality of small areas over which a piece of video data is recorded, wherein each of the plurality of small areas includes: a first sub-area for storing moving picture data of a certain time period; and a plurality of second sub-areas for storing different pieces of sub-data, the different pieces of sub-data being reproduced simultaneously with the moving picture data of the first sub-area.

With the above construction, the channel table defines the relation between the logical channels and the physical channels, thereby correctly relating logical channels to physical channels even if different numbers of physical channels or different physical channels are assigned to the plurality pieces of video data. Accordingly, the sub-data can be managed correctly through entire pieces of video data. It is possible with this construction to prevent a reproduction of a piece of sub-data whose physical channel is not assigned to the piece of video data. It is also possible to prevent a malfunction in which a wrong or different piece of sub-data is reproduced when a piece of video data changes to another in reproduction.

In the above multimedia optical disc, each of the plurality of small areas may further include: a third sub-area for storing control information which includes a command specifying a piece of sub-data in the plurality of second sub-areas which should be reproduced with the moving picture data of the first sub-area, wherein the control information is effective through a period during which data of a piece of small area including the control information is reproduced.

With the above construction, a piece of sub-data can be changed dynamically to another with the use of the command during the reproduction of video data.

in the above multimedia optical disc, the control information may include a branch command which specifies a piece of video data as a branch destination, the branch command reflecting an interactive operation in a disc reproduction apparatus during a reproduction of video data.

With the above construction, the interactive operation in the disc reproduction apparatus is achieved. It is possible for the disc reproduction apparatus to maintain the reproduction of the same kind of sub-data even if during reproduction there is a branch from one piece of video data to another as a result of a user input in the interactive operation. In other words, even if a physical channel of sub-data before branching cannot be assigned to sub-data in the branch destination video data, an appropriate physical channel is assigned to the sub-data by referring to the channel table.

In the above multimedia optical disc, the channel table may include a flag for each of the plurality of logical channel numbers, the flag indicating whether a corresponding logical channel is effective.

With the above construction having the permission flag, it is possible to prevent a malfunction in which sub-data of physical channel not intended to be reproduced is reproduced.

The above object is also achieved by a disc reproduction apparatus for reproducing a multimedia optical disc which is comprised of a video data area and a management information area, wherein the video data area stores plurality pieces of video data, wherein a piece of moving picture data and plurality pieces of sub-data are interleaved in each of the plurality pieces of video data, wherein the plurality pieces of sub-data are reproduced selectively and synchronized with the piece of moving picture data, wherein the management information area stores a channel table in which a plurality of logical channel numbers are respectively related to a plurality of physical channel numbers for each of the plurality of pieces of video data, wherein the plurality of logical channel numbers are dealt with in the disc reproduction apparatus, and wherein the plurality of physical channel numbers are used to physically identify the plurality pieces of sub-data of the multimedia optical disc. The disc reproduction apparatus comprising: reading means for reading data from the multimedia optical disc; channel number holding means for holding a logical channel number; determining means for determining a physical channel number to be reproduced based on the channel table read by the reading means and the logical channel number held by the channel number holding means; selecting means for selecting a piece of sub-data among a plurality pieces of sub-data read by the reading means, the piece of sub-data corresponding to the physical channel number determined by the determining means; and reproducing means for reproducing a piece of moving picture data read by the reading means and the piece of sub-data selected by the selecting means.

With the above construction, the channel table defines the relation between the logical channels and the physical channels, thereby correctly relating logical channels to physical channels even if different numbers of physical channels or different physical channels are assigned to the plurality of pieces of video data. Accordingly, the sub-data can be managed correctly through entire pieces of video data. It is possible with this construction to prevent a reproduction of a piece of sub-data whose physical channel is not assigned to the piece of video data. It is also possible to prevent a malfunction in which a wrong or different piece of sub-data is reproduced when a piece of video data changes to another in reproduction.

The above disc reproduction apparatus may further comprise: table retaining means for retaining a channel table read by the reading means; and table updating means for updating the table retaining means each time the reading means reads a new channel table, wherein the determining means reads, from the channel table retained by the table retaining means, a physical channel number corresponding to the logical channel number held by the channel number holding means each time the table updating means updates the table retaining means, wherein the selecting means selects a piece of sub-data which corresponds to the physical channel number read by the determining means.

In the above disc reproduction apparatus, the channel table may include a flag for each of the plurality of logical channel numbers, the flag indicating whether a corresponding logical channel is effective, wherein the disc reproduction apparatus further comprises: receiving means for receiving a sub-data switch instruction input by a user, wherein the determining means further includes: table searching means for, when the receiving means receives the sub-data switch instruction, searching the channel table retained by the table retaining means to detect a logical channel number having a flag indicating that a corresponding logical channel is effective, wherein the determining means reads the logical channel number detected by the table searching means and also reads a physical channel number which corresponds to the detected logical channel number, wherein the channel number holding means holds the logical channel number read by the determining means, wherein the selecting means selects the piece of sub-data which corresponds to the physical channel number read by the determining means.

With the above construction, the interactive operation in the disc reproduction apparatus is achieved. It is possible for the disc reproduction apparatus to maintain the reproduction of the same kind of sub-data even if reproduction branches from one piece of video data to another by a user input in the interactive operation. In other words, even if a physical channel of sub-data before branching cannot be assigned to sub-data in the branch destination video data, an appropriate physical channel is assigned to the sub-data by referring to the channel table.

In the above disc reproduction apparatus, the piece of small area of the multimedia optical disc may store control information which includes a command specifying a piece of sub-data in the plurality of second sub-areas which should be reproduced with the moving picture data, wherein the control information is effective through a period during which data of a piece of small area including the control information is reproduced, wherein the receiving means further receives an instruction which instructs whether to execute the command, wherein the determining means, when the receiving means receives an instruction to execute a command, reads the logical channel number specified by the command received by the receiving means and also reads a physical channel number which corresponds to the read logical channel number, wherein the selecting means selects the piece of sub-data which corresponds to the physical channel number read by the determining means.

With the above construction, a piece of sub-data can be changed dynamically to a desired piece during the reproduction of video data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIG. 11 shows the construction of the button color information and the button information;

FIG. 12 shows button commands specified by the button information, the button commands corresponding to the buttons;

FIG. 21 is a block diagram showing the construction of the sub-picture decoder;

FIG. 29A shows the used for the title menu;

FIG. 33 is a flowchart showing the procedure of producing the optical disc used in the embodiment.

DESCRIPTION OF THE PREFERRED EMBODIMENT

<Physical Construction of the Optical Disc>

In the present embodiment, a multimedia optical disc called DVD (Digital Versatile Disc) is used. The following is the physical construction of the DVD.

Figure 1:
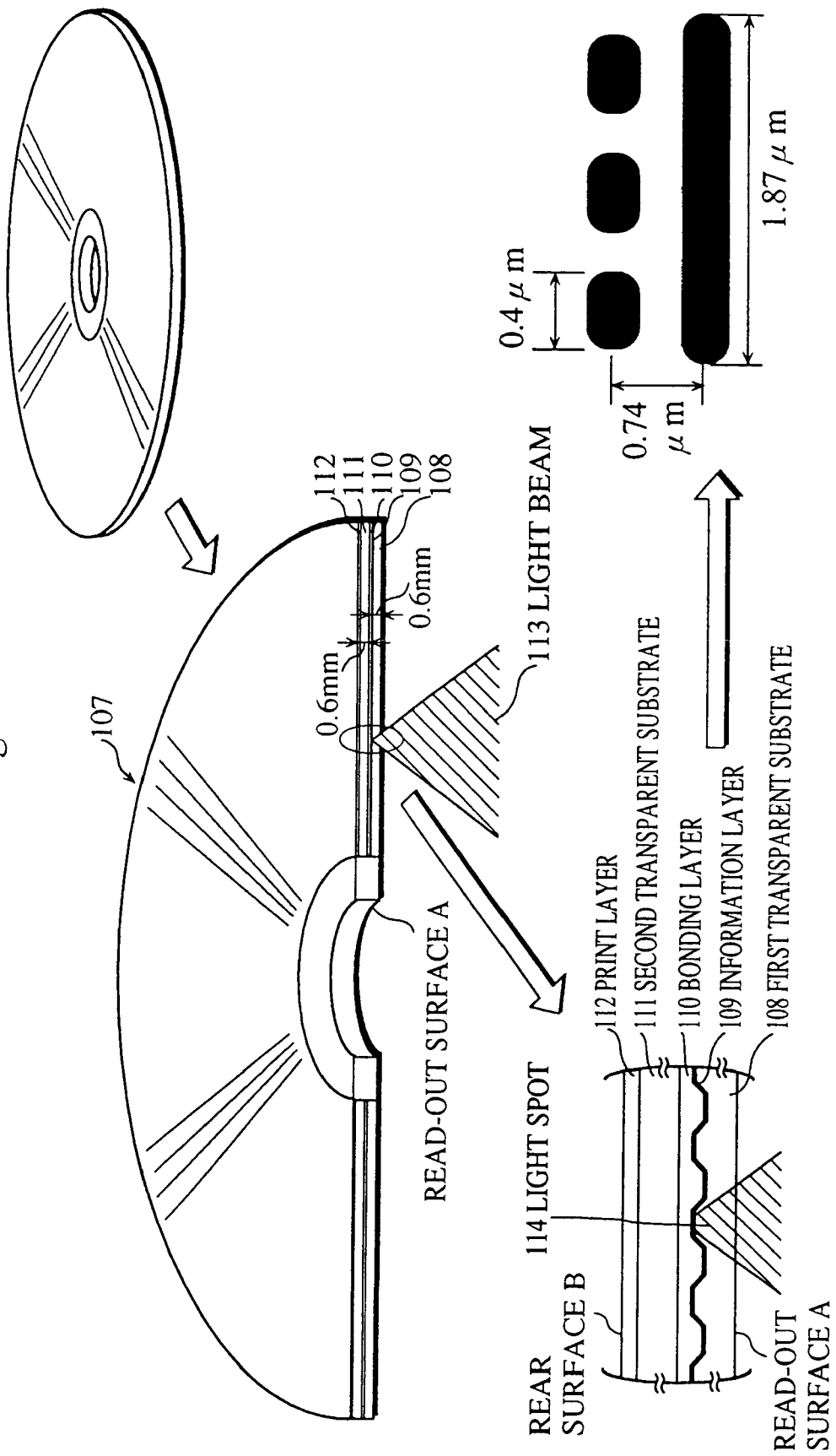
FIG. 1 shows an appearance, a cross-section, an enlarged circled part, and pit shapes of the DVD of the embodiment.

FIG. 1 shows an appearance, a cross-section, an enlarged circled part, and pit shapes of the DVD of the present embodiment.

The DVD of the drawing has the same diameter as CDs: about 12 cm.

In the cross-section of the drawing, starting from the bottom, DVD 107 is formed of a first transparent substrate 108 with the thickness of about 0.6 mm, an information layer 109, a bonding layer 110, a second transparent substrate 111, and, if necessary, a print layer 112 on which a label is printed. Bonding layer 110, being formed between information layer 109 and transparent substrate 111, bonds these layers. A reflective membrane such as metal foil is attached to a surface of information layer 109 where it is in contact with first transparent substrate 108. Print layer 112 is not indispensable to DVD 107 and can be omitted, if not necessary, to expose transparent substrate 111.

The lower surface of DVD 107 in FIG. 1 is called read-out surface A on which light beam 113 is shown for reproducing information; the upper surface is called rear surface B on which printing layer 112 is formed.

Indented and protruding pits are formed, with high density, in the reflective membrane attached to a surface of information layer 109 where it is in contact with first transparent substrate 108. Information is recorded by changing the length and distance of the pits. That is, the indented and protruding pits of first transparent substrate 108 is printed onto information layer 109. The length of a pit ranges, as shown in the drawing, from 0.4 µm to 2.13 µm. A whole series of pits form a spiral track with a radial distance of 0.74 µm between the pit lines. The surface recording density of DVD 107 is higher than that of CDs with shorter pit length and narrower track pitch, the track pitch being the pitch of the spiral track.

Read-out surface A is a flat surface. Second transparent substrate 111 is a reinforcer with flat surfaces on both sides, being about 0.6 mm thick and made of the same material as first transparent substrate 108.

Information is retrieved by letting an optical head (not shown in the drawings) shine light beam 113 onto read-out surface A to focus and form an image on information layer 109 as optical spot 114. When light beam 113 is shone onto a pit, an optical interference is generated due to the difference of phase between the pit and the surroundings and the reflection rate reduces; when light beam 113 is shone onto an area other than the pits, such an optical interference is not generated and the reflection rate does not reduce. Such changes in the reflection rate are used for reproducing the retrieved information. The light spot 114 on a DVD has a diameter of around 1/1.6 times the diameter of a light spot on a conventional CD due to an increase in the numerical aperture (NA) of the objective lens and a reduction in the wavelength λ of the light beam. DVD 107 of the physical construction described above can store about 4.7 GB of information on one side, which is almost eight times the storage capacity of a conventional CD.

<Data Structure of DVD>

Now, the data structure of DVD 107 is described.

Figure 2:
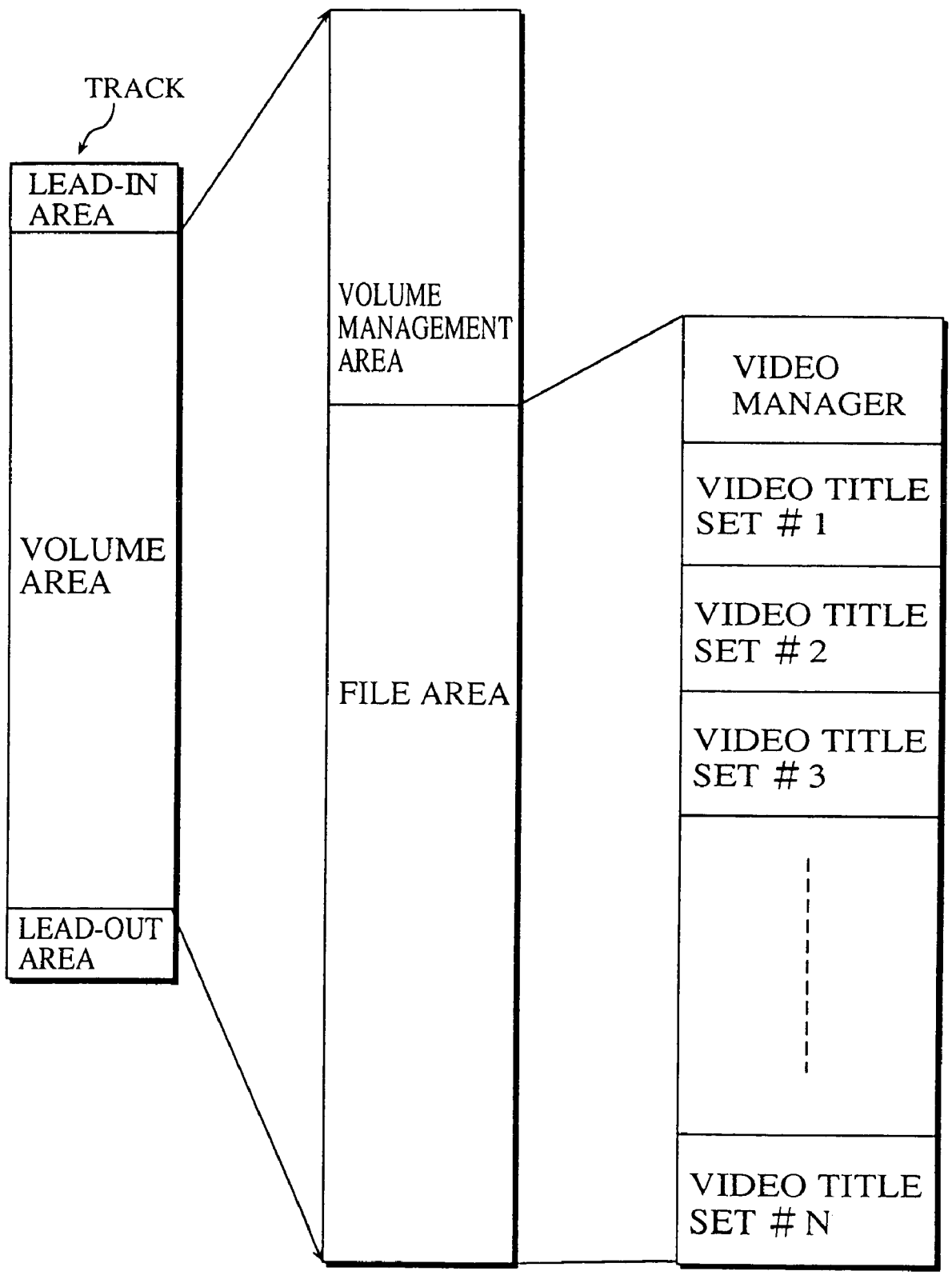
FIG. 2 shows the data structure of the DVD.

FIG. 2 shows the data structure of DVD 107. As shown in this drawing, DVD 107 includes, in a direction from the center of the disc to the circumference, a lead-in area, a volume area, and a lead-out area on a spiral track.

The lead-in area stores operation stabilization data which is used when the disc reproduction apparatus starts reading data from DVD 107.

The lead-out area informs the data reproduction apparatus of the end of the recorded information.

The volume area stores a various kinds of data which make up an application. The volume area is comprised of a large number of logical blocks (also referred to as sectors) arrayed as a one-dimensional array on the spiral track. The logical blocks, each having 2 KB, are identified by their serial numbers (block numbers) which are sector addresses. The size of a logical block is the minimum unit in data reading by the disc reproduction apparatus.

The volume area is divided into a volume management area and a file area.

The volume management area, having as many logical blocks starting from the first logical block as are required to manage the whole disc, restores information which, for example, conforms to ISO (International Organization for Standardization) 13346 and is used to show the relation between a plurality of file names and addresses of groups of logical blocks.

The file area stores at least a Video Title Set and a Video Manager. In the present embodiment, the Video Title Set and the Video Manager are each treated as a file for the sake of conveniences. However, in reality, each of them is comprised of a series of files recorded on the track. This is because the file capacity may increase so greatly that the disc reproduction apparatus may have a difficulty in dealing with such files in case that, for example, the disc includes a movie.

The Video Title Set stores a plurality of Video Objects (VOBs) and information for controlling the reproduction of the VOBs. The VOB includes moving pictures, audio data, and still pictures for a part of an application in the disc such as an interactive movie. One Video Title Set may be divided into some parts. Suppose the Video Title Set is divided into three versions of a movie: a theater version, a no-cut version, and a TV on-air version. Movies sometimes have different versions for reasons of performance or ethical problems. Therefore, it has been desired that the plurality of versions of a movie are included in one disc. The present embodiment achieves this by combining a plurality of VOBs for each version. For this, the Video Title Set may include VOBs commonly used by the versions and VOBs unique to respective versions. Recording of a plurality of Video Title Sets (movies, interactive movies, etc.) in a disc is achieved for the first time by DVDs thanks to the large storage capacity of about 4.7 GB.

The Video Manager manages the whole Video Title Sets in the disc. The Video Manager stores a VOB set (a plurality of VOBs) and information for managing the plurality of VOBs. The construction is the same as that of the Video Title Set, but the purpose is different. That is, the Video Manager manages the whole Video Title Sets in the disc. For this purpose, the Video Manager includes VOBs for a system menu. The system menu is reproduced when the disc reproduction apparatus with the disc loaded is turned on. The system menu can also be called and reproduced temporarily during a reproduction of a title. The system menu is used so that the user can select a video title set or set/change channels for audio and sub-picture data.

<Construction of Video Title Set . . . (1)>

Figure 3:
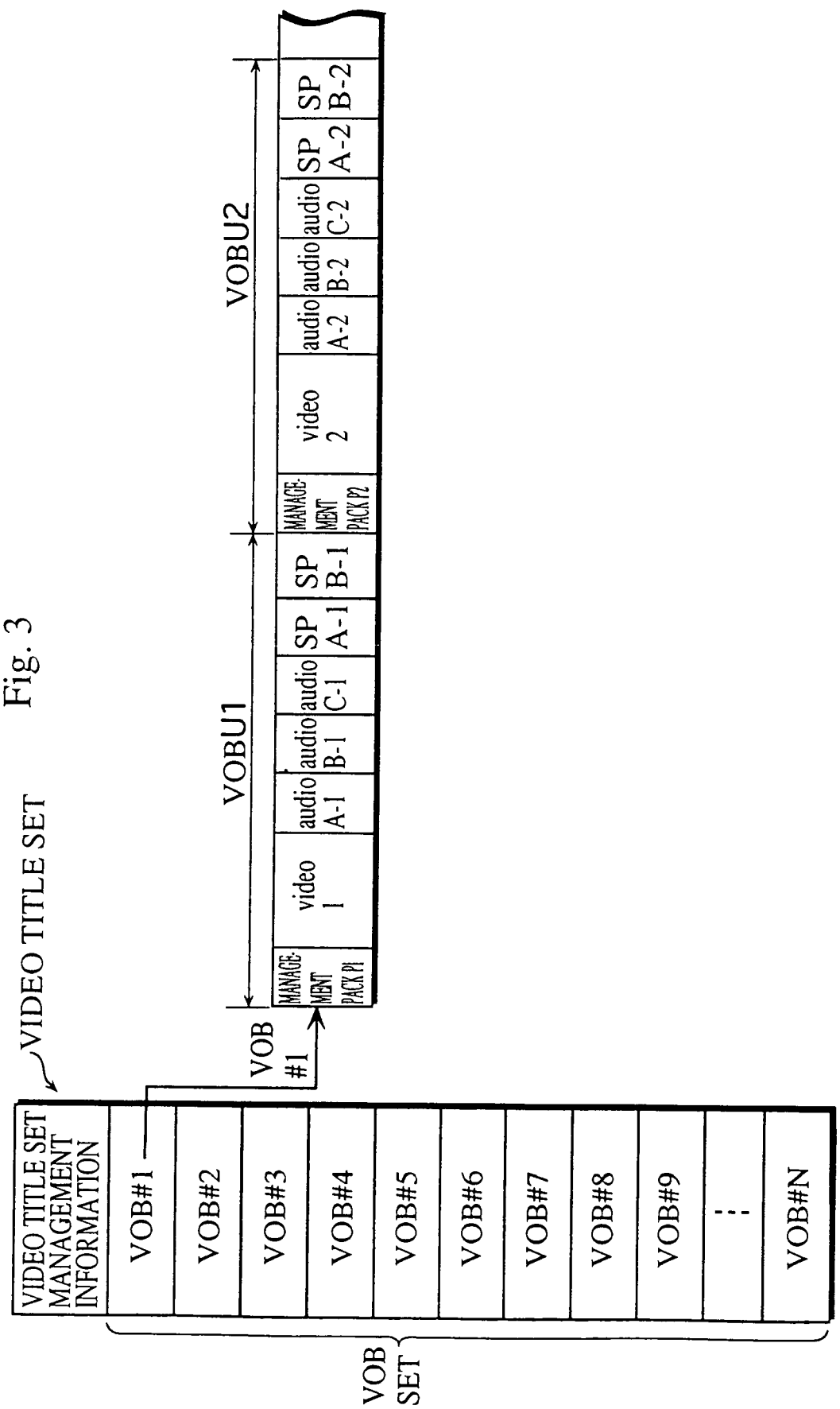
FIG. 3 shows the construction of the Video Title Set.

FIG. 3 shows the construction of the Video Title Set.

The Video Title Set includes a plurality of VOBs and the Video Title Set management information that manages the reproduction order of the VOBs.

Each VOB includes at least a VOBU (VOB Unit). Each VOBU is comprised of a piece of moving picture (video) data which is recorded in GOP (Group Of Picture) unit with a certain time period, a plurality pieces of audio data, a plurality pieces of sub-picture data, and a management pack. The plurality pieces of audio data and the plurality pieces of sub-picture data correspond to respective channels of kinds of audio data and sub-picture data. The kinds of audio data and sub-picture data are selectively reproduced by the disc reproduction apparatus.

"audio A," "audio B," and "audio C" shown in the drawing, for example, may include different languages, such as English and Japanese, or voices of a male and a female.

"SP A" and "SP B" shown in the drawing are still pictures displayed on the same screen with moving pictures and, for example, may be used as subtitles of different languages. The sub-picture data can also be used as menus, which is a more important usage of the sub-picture data. That is, the sub-picture data can be used as a menu picture of an interactive application or a system menu.

The management pack, having 2 KB, stores information for managing the VOBUs. The management pack includes Highlight Information which controls displaying of buttons in menu pictures and operations in menus. The Highlight Information, with menu pictures of sub-picture data, achieves the interactive operations in units of VOBUs.

<Construction of VOB>

Figure 4A:
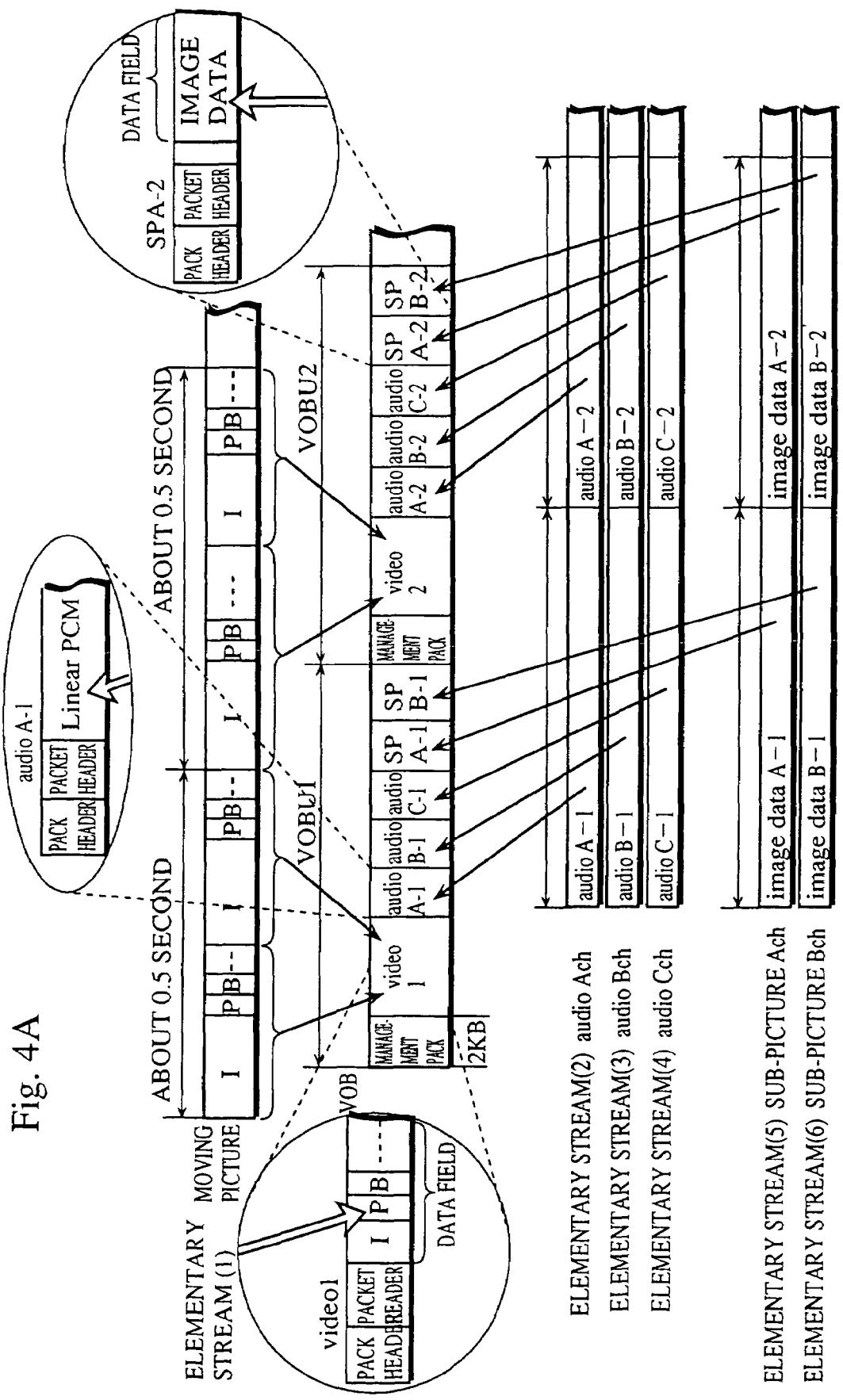
FIG. 4A and FIG. 4B show the construction of the VOB.

FIG. 4A shows the construction of the VOB. The drawing shows a VOB and the materials interleaved in the VOB. The elementary streams (1)-(6) of the drawing are materials which are interleaved in the VOB.

Elementary stream (1) is moving picture data having been compressed under MPEG2. Elementary stream (1) is interleaved in each VOBU in units of GOPs. Here, a GOP represents a piece of compressed moving picture data of about 0.5 seconds and includes at least an I-picture. A VOBU includes a GOP of moving picture data.

Elementary streams (2)-(4) are audio data corresponding to the moving picture data and are also called audio channels A-C respectively. Each audio channel is divided into a plurality of parts which each, having almost the same time period as one GOP, are included in corresponding VOBUs.

Elementary streams (5)-(6) are sub-picture data corresponding to the moving picture data and are also called sub-picture channels A-B respectively. Each sub-picture channel is divided into a plurality of parts which each, having almost the same time period as one GOP, are included in corresponding VOBUs.

Figure 4B:
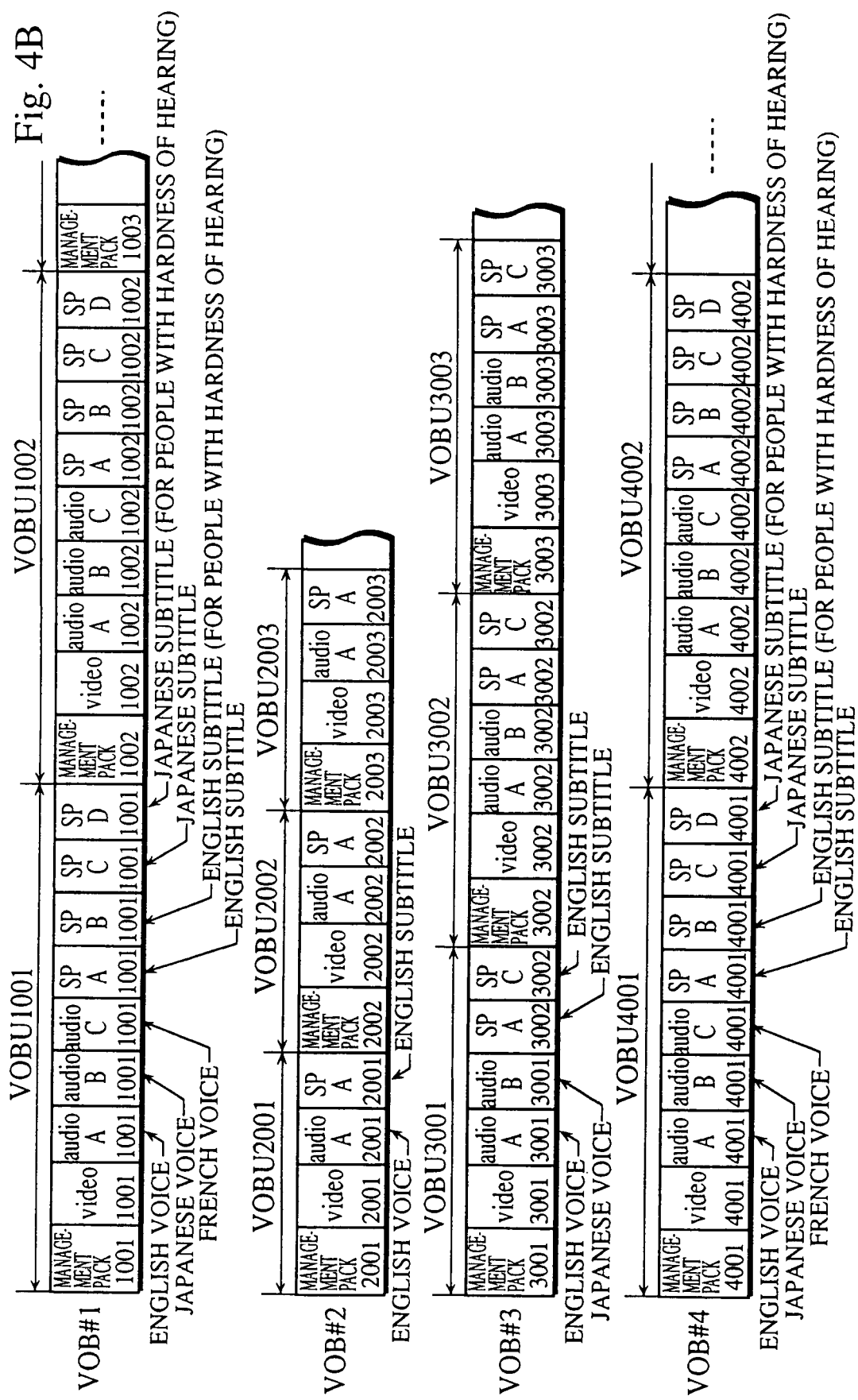

FIG. 4B shows some VOBs which respectively have channels for audio data and sub-picture data.

VOB #1 of the drawing includes three kinds of voices, four kinds of subtitles, and one kind of moving picture. In the drawing:

moving picture data: video 1001, video 1002, . . .

English voice: audio A1001, audio A1002, . . .

Japanese voice: audio B1001, audio B1002, . . .

French voice: audio C1001, audio C1002, . . .

English subtitle: SP A1001, SP A1002, . . .

English subtitle (for people with hardness of hearing): SP B1001, SP B1002, . . .

Japanese subtitle: SP C1001, SP C1002, . . .

Japanese subtitle (for people with hardness of hearing): SP D1001, SP D1002, . . .

VOB #1 is a part of a TV-on-air version and provides three languages for the voice and two languages for the subtitle. The subtitles for people with hardness of hearing provide descriptions of sounds, such as "somebody is knocking on the door" or "clatter of storm against the window-pane."

Similarly, VOB #2 is a part of a no-cut version and provides English for the voice and subtitle. VOB #2 may be a portion unique to the no-cut version.

VOB #3 provides English and Japanese voices and subtitles as well as one kind of moving picture. VOB #3 may be a part of a theater version, the part having been cut and not included in the TV-on-air version.

VOB #4 provides the same number of kinds of audio data and sub-picture data as VOB #1.

Each part of the drawing indicated as "video 1001," "audio A1001," "audio B1001" and the like includes a plurality of 2 KB packs. "video 1001" is, for example, also recognized as a set of packs which make up one GOP. The reason each of such parts is divided into packs is that the size (2 KB) of the pack is the same as that of the logical block (sector) which is a minimum unit when data is read from the disc by the disc reproduction apparatus.

<Data Format of Pack>

The description below is the data format of the packs which are included in the moving picture data, audio data, and sub-picture data of VOBUs.

Each of the packs shown in FIGS. 5-8 includes a pack header, a packet header, and a data field and is 2 KB in size. The packet header and the data field make up a packet which is called a PES (Packetized Elementary Stream) packet. The pack header and the packet header are stipulated in MPEG2 and are not explained here.

One of the characteristics of the present embodiment is the use of special packet stipulated in MPEG2 which are called private packet. It is possible to define the private packet according to the purpose. In the present embodiment, private packet 1 is defined as the audio data or sub-picture data, private packet 2 is defined as the management pack.

Figure 5:
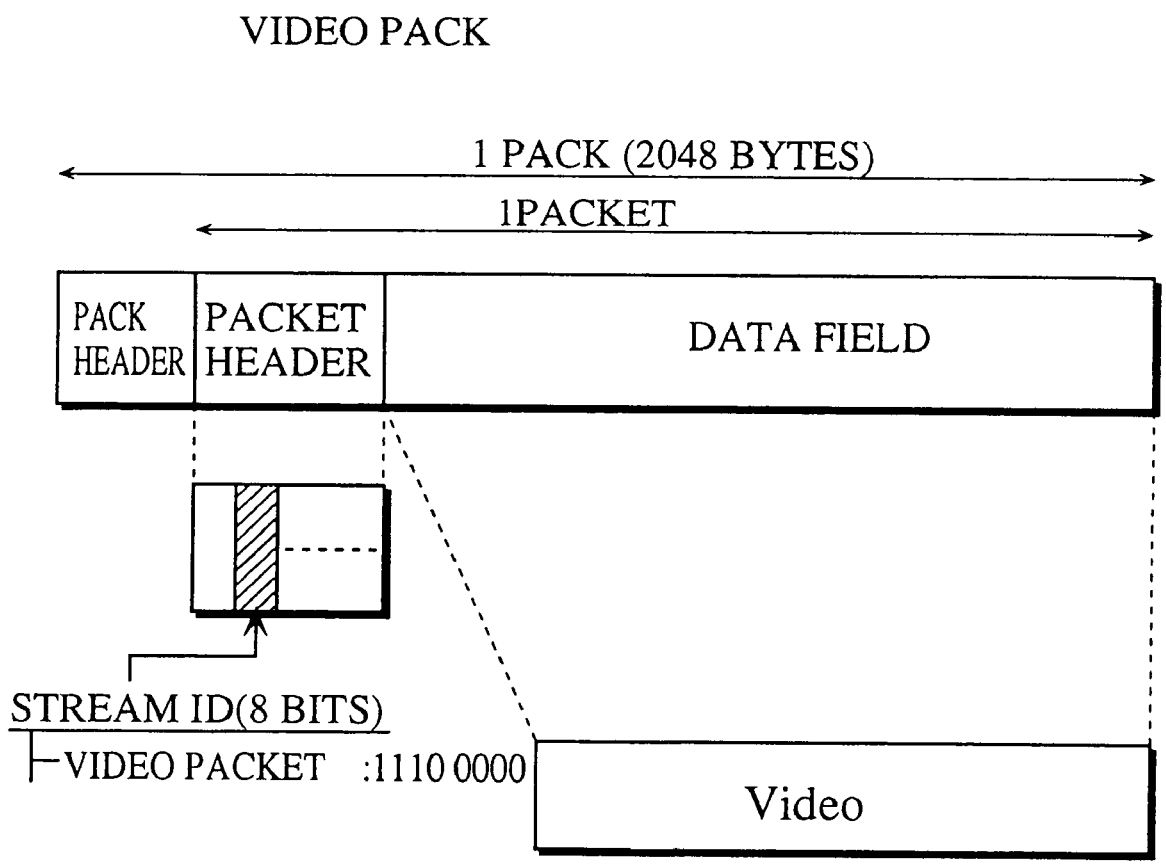
FIG. 5 shows the data format of the video pack.

FIG. 5 shows the data format of the packs that make up the moving picture data such as "video 1" of FIG. 4A (hereinafter such packs are called video packs). The video pack is comprised of a pack header, a packet header, and a data field. The data field stores moving picture data. As shown in the drawing, a stream ID, which is a part of the packet header, is set to "1110 0000." This indicates that the pack is the video pack.

Figure 6:
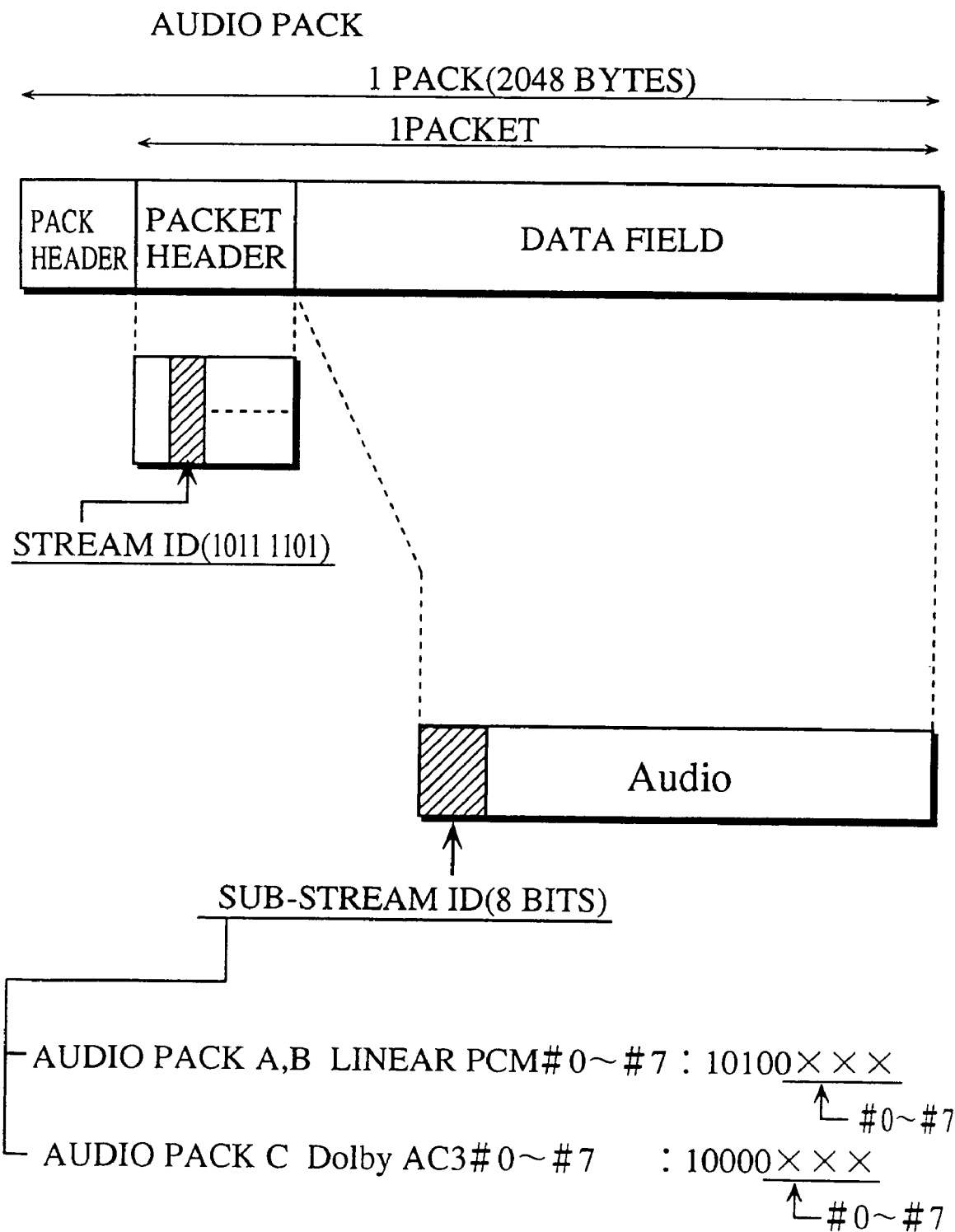
FIG. 6 shows the data format of the audio pack.

FIG. 6 shows the data format of the packs that make up the audio data such as "audio A-1" of FIG. 4A (hereinafter such packs are called audio packs). The audio pack is comprised of a pack header, a packet header, and a data field. The data field stores audio data. As shown in the drawing, the stream ID is set to "1011 1101." This indicates that the pack is private packet 1: Furthermore, the higher five bits of a sub-stream ID or identification indicia, which is a part of the data field, indicate a coding type of the audio data and the lower three bits indicate a channel. This means audio data can be recorded in the disc in eight channels at the maximum. In the present embodiment, the eight audio channels indicated by the lower three bits of the sub-stream ID are respectively called audio physical channels 0-7.

Figure 7:
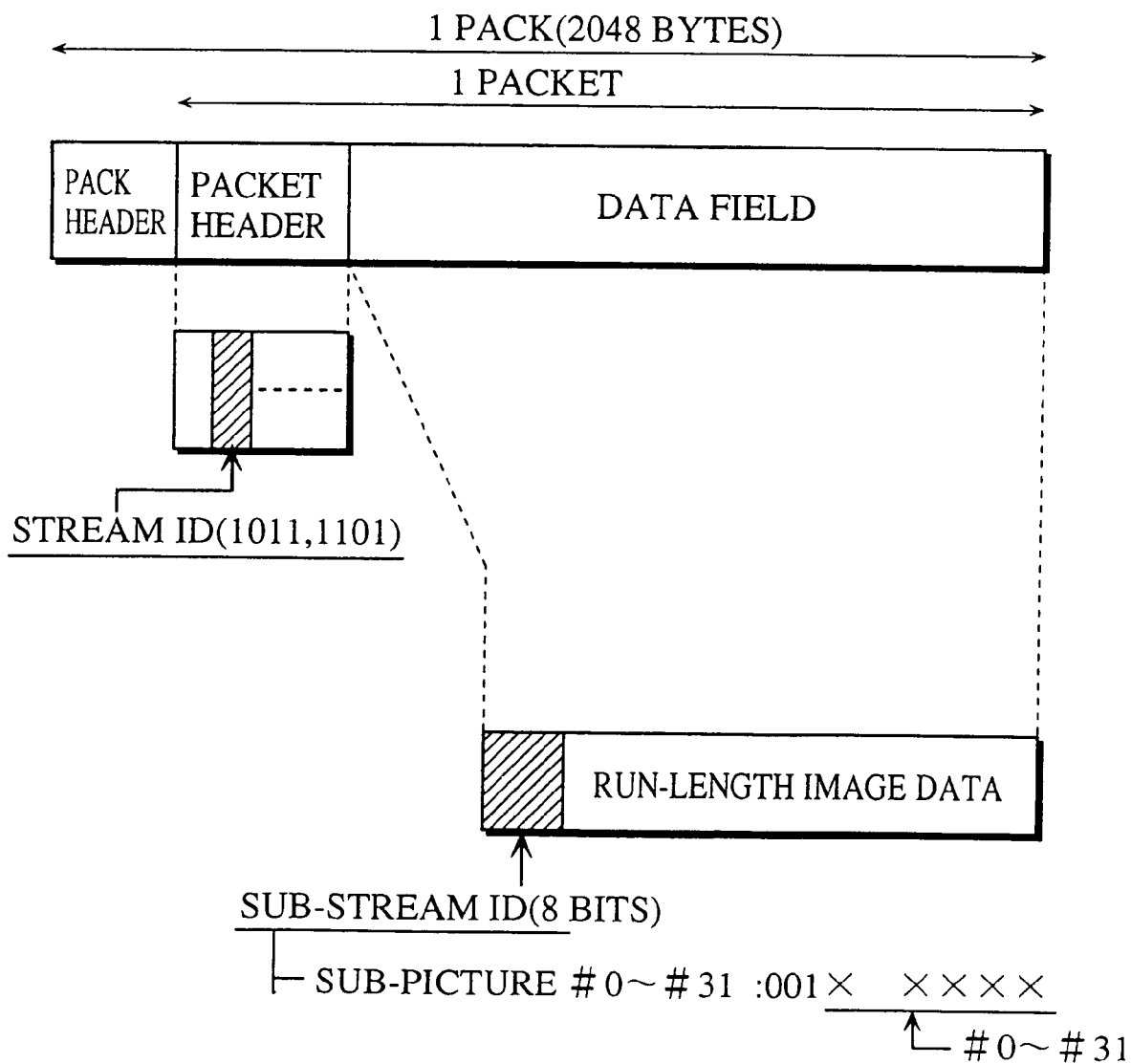
FIG. 7 shows the data format of the sub-picture pack.

FIG. 7 shows the data format of the packs that make up the sub-picture data such as "SP A-1" of FIG. 4A (hereinafter such packs are called sub-picture packs). The sub-picture pack is comprised of a pack header, a packet header, and a data field. The data field stores sub-picture data (image data). The stream ID or identification indicia is set to "1011 1101," indicating that the pack is private packet 1. Furthermore, the higher three bits of the sub-stream ID or identification indicia indicate the data is the sub-picture data; the lower five bits indicate a channel. This means sub-picture data can be recorded in the disc in 32 channels at the maximum. In the present embodiment, the 32 sub-picture channels indicated by the lower five bits of the sub-stream ID are respectively called sub-picture physical channels 0-31 or SP physical channels 0-31. The above names, namely the audio physical channel and the sub-picture physical channel, are used to differentiate them from the audio logical channel and the sub-picture logical channel respectively. The physical channels and the logical channels are mapped by the disc reproduction apparatus with one-to-one relation.

Figure 8:
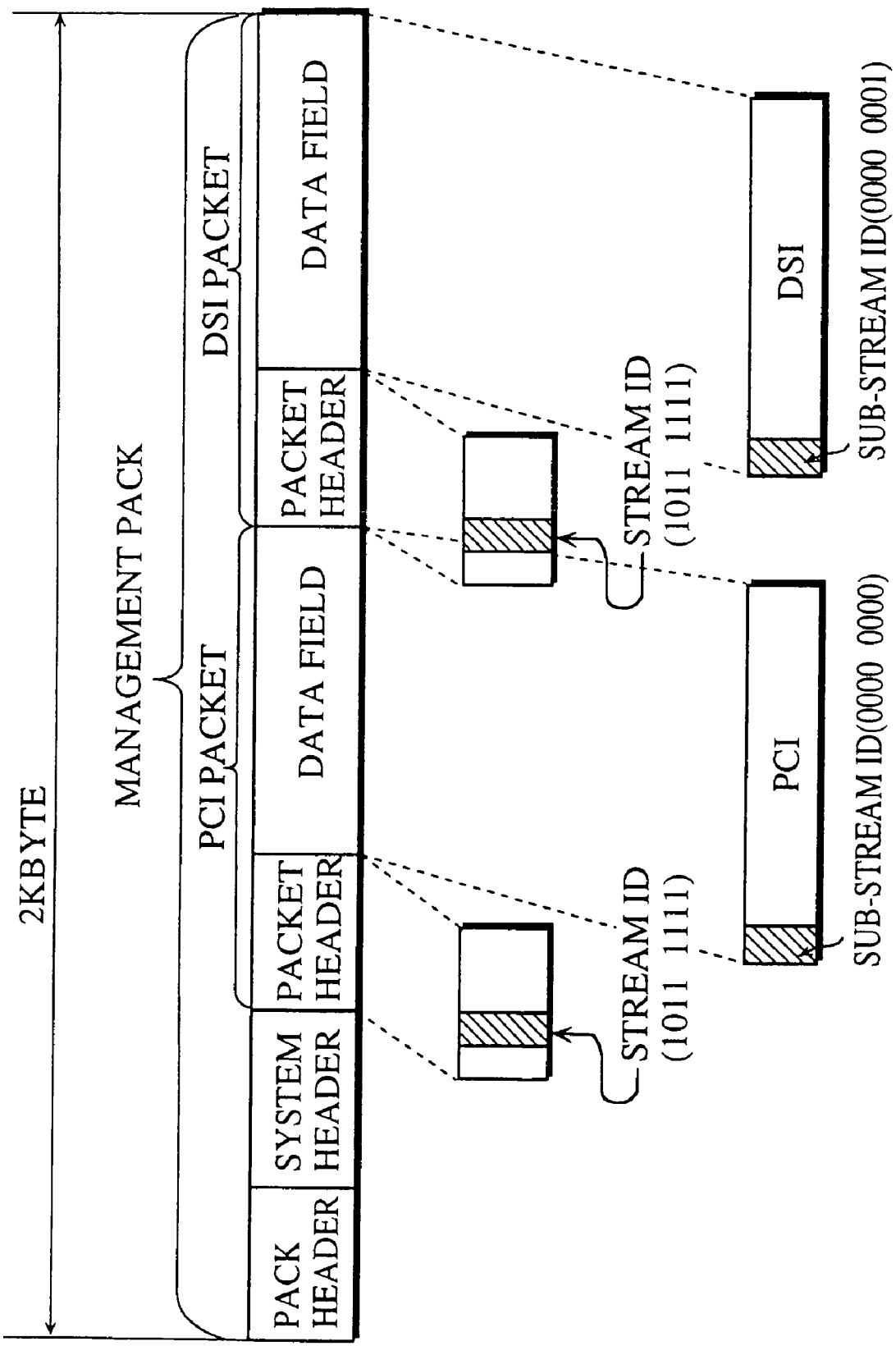
FIG. 8 shows the data format of the management pack.

FIG. 8 shows the data format of the management pack of FIG. 4A. The management pack is comprised of a pack header, a system header, a PCI (Presentation Control Information) packet, and a DSI (Data Search Information) packet. The PCI packet is comprised of a packet header and a data field. The DSI packet is comprised of a packet header and a data field. The stream IDs of the packet headers of the PCI packet and the DSI packet are both set to "1011 1111," indicating that the pack is private packet 2. The sub-stream ID of the data field of the PCI packet is set to "0000 0000," indicating that the packet is the PCI packet; the sub-stream ID of the data field of the DSI packet is set to "0000 0001," indicating that the packet is the DSI packet.

The DSI packet stores information for managing the synchronization of the moving picture data with the audio data and information for achieving special reproductions such as forward and rewinding. These kinds of information include a return destination address which is the starting position of the VOBU that includes the first portion of the sub-picture data of a menu when the sub-picture data of the menu is recorded over a plurality of VOBUs. The return destination address is used to resume a reproduction of an application which has been stopped since the user pressed the MENU key of the remote controller and the video manager jumped to the system menu to change the audio and sub-picture streams.

The PCI packet stores Highlight Information for achieving interactive operations with the user. The Highlight Information is control information for responding to the user operation when the menu is reproduced by the sub-picture data of the VOBU in which the Highlight Information is also included. Here, the user operation indicates an action by the user of pressing the CURSOR key, ten keys, ENTER key or the like of the remote controller to input an instruction to the disc reproduction apparatus.

Figure 9:
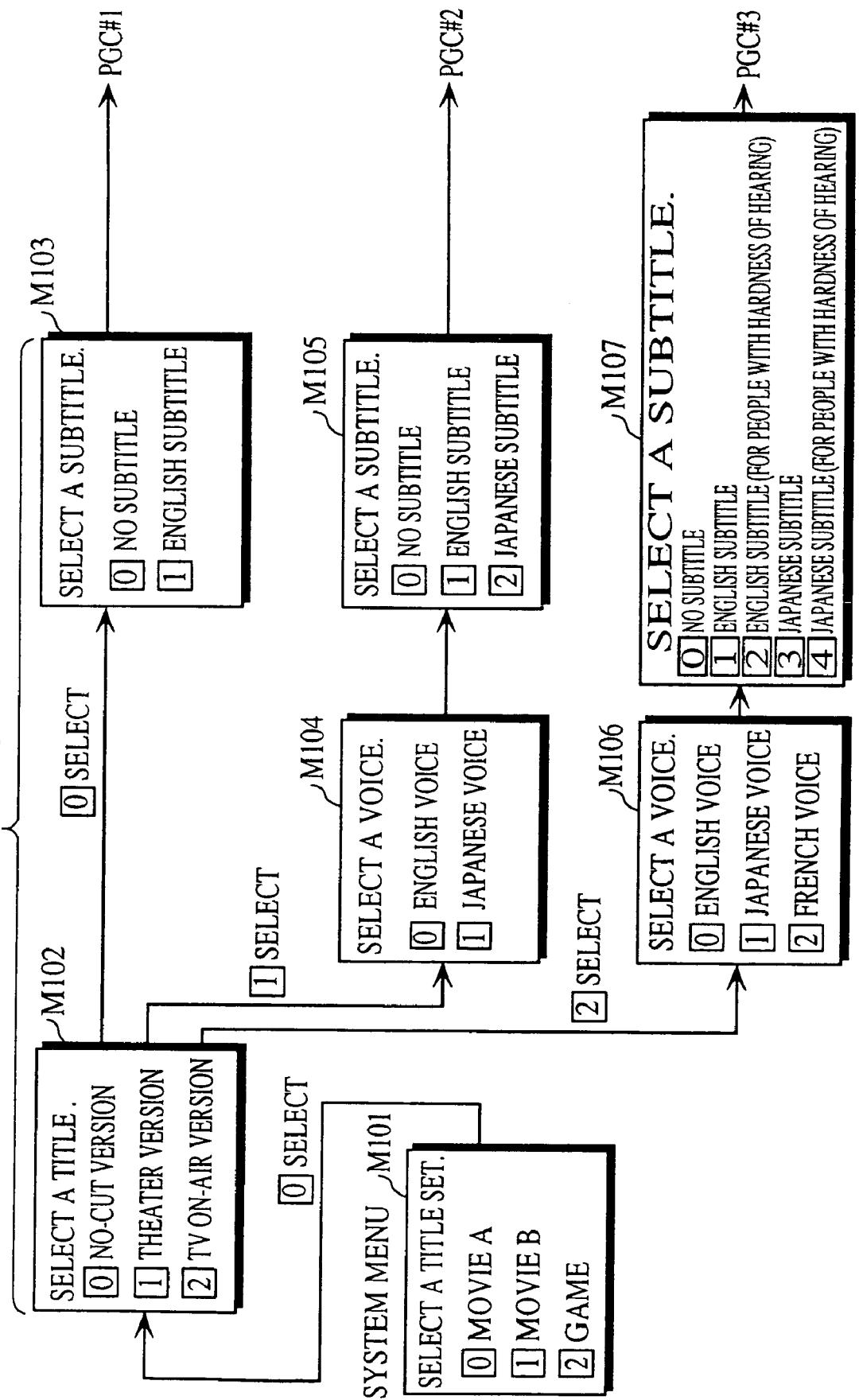
FIG. 9 shows menu images by sub-picture data.

Now, the Highlight Information is described in detail with reference to FIG. 9. FIG. 9 shows the system menu and some images of the title menu. Menu image M101 of the system menu displays three options (0 MOVIE A, 1 MOVIE B, and 2 GAME). The Highlight Information corresponding to menu image 101 includes control information which specifies the number of buttons, the selection color and determination color for each button, the commands to be executed when the buttons are determined, and the like. Other menu images, M102-M108 have the same construction as menu image M101.

<Construction of Management Pack>

Figure 10:
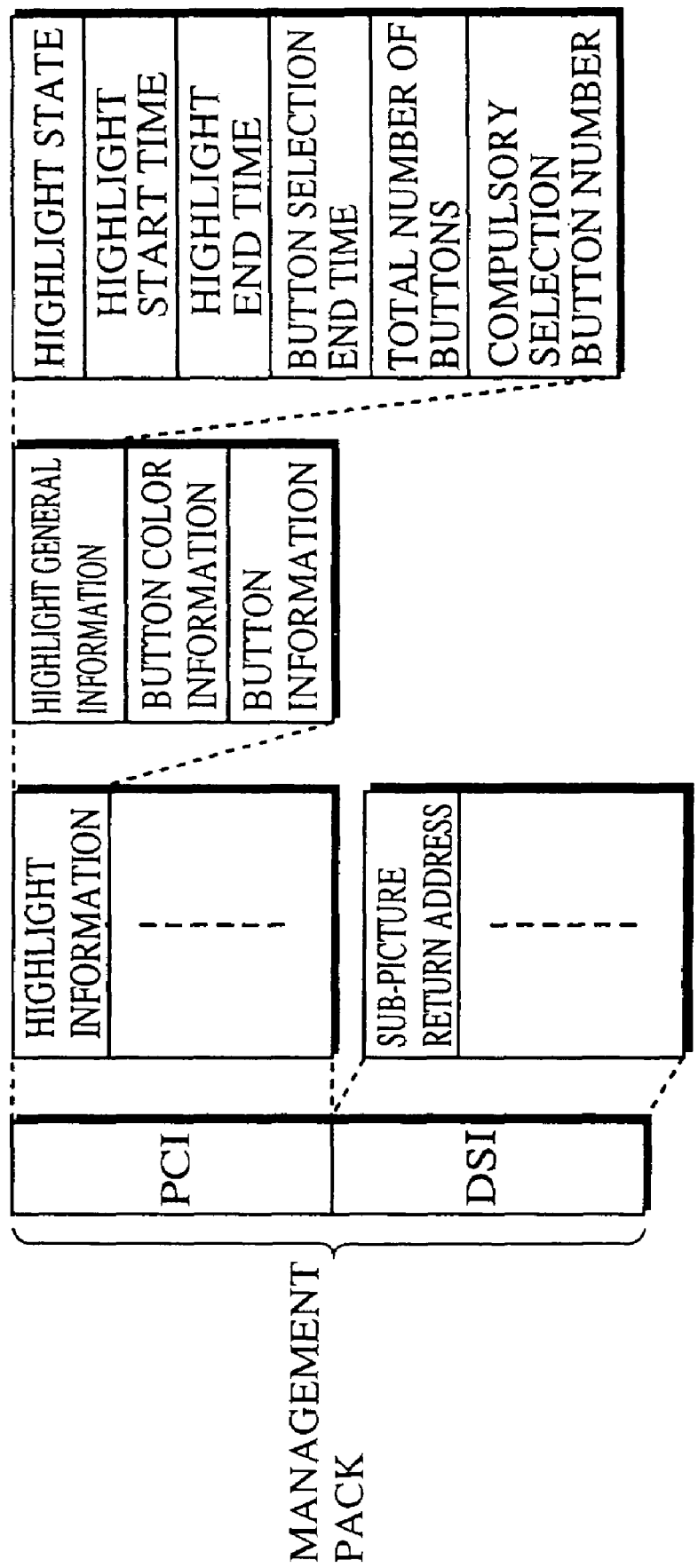
FIG. 10 shows a hierarchical representation of the construction of the management pack.

FIG. 10 shows a hierarchical representation of the construction of the management pack. As also shown in FIG. 8, the management pack includes the PCI packet and the DSI packet. The PCI packet includes the Highlight Information.

<Construction of Highlight Information>

As shown in FIG. 10, the Highlight Information of the PCI pack is comprised of highlight general information, button color information, and button information. The highlight general information is general information on highlight displays, where the highlight display indicates that a button in a menu image is displayed in a manner of differentiating the button from the other buttons if the button is in a selection state or a determination state. Such a menu display reflects the user operation.

<Construction of Highlight General Information>

The highlight general information, as shown in the drawing, includes a highlight state, a highlight start time, a highlight end time, a button selection end time, total number of buttons, and a compulsory selection button number.

The highlight state indicates whether the video display period of about 0.5 seconds, namely the VOBU of the present PCI packet, includes any buttons, and also indicates, if it includes any buttons, and whether the buttons are the same as those of the preceding PCI packet.

The highlight state represents, for example, the following.

00: no button is included
01: new buttons are included
10: the buttons are the same as those of the preceding PCI packet.
11: the buttons are the same as those of the preceding PCI packet except the highlight command.

The highlight start time, the highlight end time, and the button selection end time respectively indicate the start time and end time of the highlight display and a deadline time for selecting a button. These times are calculated by regarding the start of the reproduction of the present VOB as the starting point. The disc reproduction apparatus calculates the system time as the standard clock for the whole reproduction operations by regarding the start of the reproduction of the present VOB as the starting point. With such times, the disc reproduction apparatus synchronizes the display of a menu image with the corresponding highlight display.

The total number of buttons indicates the number of buttons currently used, among 36 buttons available. The buttons have serial numbers.

The compulsory selection button number specifies a button which is displayed as an initial selection button when the highlight display starts. The compulsory selection button number "63" indicates that a button is specified for the initial selection button by a button number which is stored in a storage in the disc reproduction apparatus.

<Construction of Button Color Information>

FIG. 11 shows the construction of the button color information and the button information.

The button color information is comprised of button color information 1, button color information 2, and button color information 3. That is, the button color information provides three kinds of button colors. Any of the three colors is assigned to each individual button. Although 36 buttons can be used at the maximum, different colors corresponding to the buttons are not provided in the present embodiment since it is considered as ineffective.

Each of button color information 1, button color information 2, and button color information 3 is comprised of selection color information and determination color information. The selection color information specifies a selection color which is given to a button specified by pressing the arrow keys or the like, the determination color is given to a button selected and determined by the user.

<Construction of Button Information>

As shown in FIG. 11, the button information is comprised of 1-36 pieces of button information, button information 1-36.

Each piece of the button information is comprised of button position information, adjacent button information, and a button command.

The button position information is comprised of a button color number for specifying any of button color information 1-3 and a coordinate area (highlight area) for indicating the position of the button on the menu image.

The adjacent button information specifies an adjacent button of the present button, in a direction upward/downward/leftward/rightward. This allows the user to move from one button to another by pressing the arrow keys or the like.

The button command specifies a command which is executed when the present button is determined. The command is an instruction for controlling the reproduction by the disc reproduction apparatus.

<Button Command>

FIG. 12 shows button commands specified by the button information, the button commands corresponding to the buttons. Each button command is comprised of an operation code and one or more operands.

Instruction "SetSTN" in the drawing includes operands for an audio logical channel number, a sub-picture logical channel number, and an SP flag. The command instructs the disc reproduction apparatus to reproduce the audio data and the sub-picture data of the specified logical channels. The SP flag specifies whether the sub-picture data is displayed on a screen as pictures. The logical channel numbers specified in the command are set in a register of the disc reproduction apparatus and are converted into the physical channel numbers. The disc reproduction apparatus reproduces the physical channels. This command is used for setting initial values for the audio logical channels and the sub-picture logical channels which are reproduced in the title menu or the like. This command also enables the dynamic change of the audio logical channels and the sub-picture logical channels during the reproduction of the title.

The command "Link" instructs the disc reproduction apparatus to branch to a program chain (hereinafter referred to as PGC). Here, the PGC represents a predetermined series of VOBs to be reproduced or a reproduction route. The PGC is described later in detail.

The command "CmpRegLink" includes operands for a register number, an integer, a branch condition, and a branch destination PGC number. The command instructs the present PGC to branch only when the branch condition is satisfied, with the register value and the integer. The branch conditions are "=(match)," "> (greater)," "<(smaller)," etc.

The command "SetRegLink" includes operands for a register number, an integer, a calculation, and a branch destination PGC number. The command performs a calculation with the register value and the integer, stores the calculation result in the present register, and instructs the present PGC to branch. The operands for calculations are "=(substitute)," "+(add)," "−(subtract)," "* (multiply)," "/(divide)," "MOD (modulus)," "AND (logical product)," "OR (logical sum)," "XOR (exclusive-or)," etc.

The command "SetReg" includes operands for a register number, an integer, and a calculation. The command performs a calculation with the register value and the integer and stores the calculation result in the present register. The operands for calculations are the same as those for the command "SetRegLink."

<Construction of Video Title Set . . . (2)>

The following is the description of the Video Title Set management information which controls the reproduction route of the VOBs.

Figure 13A:
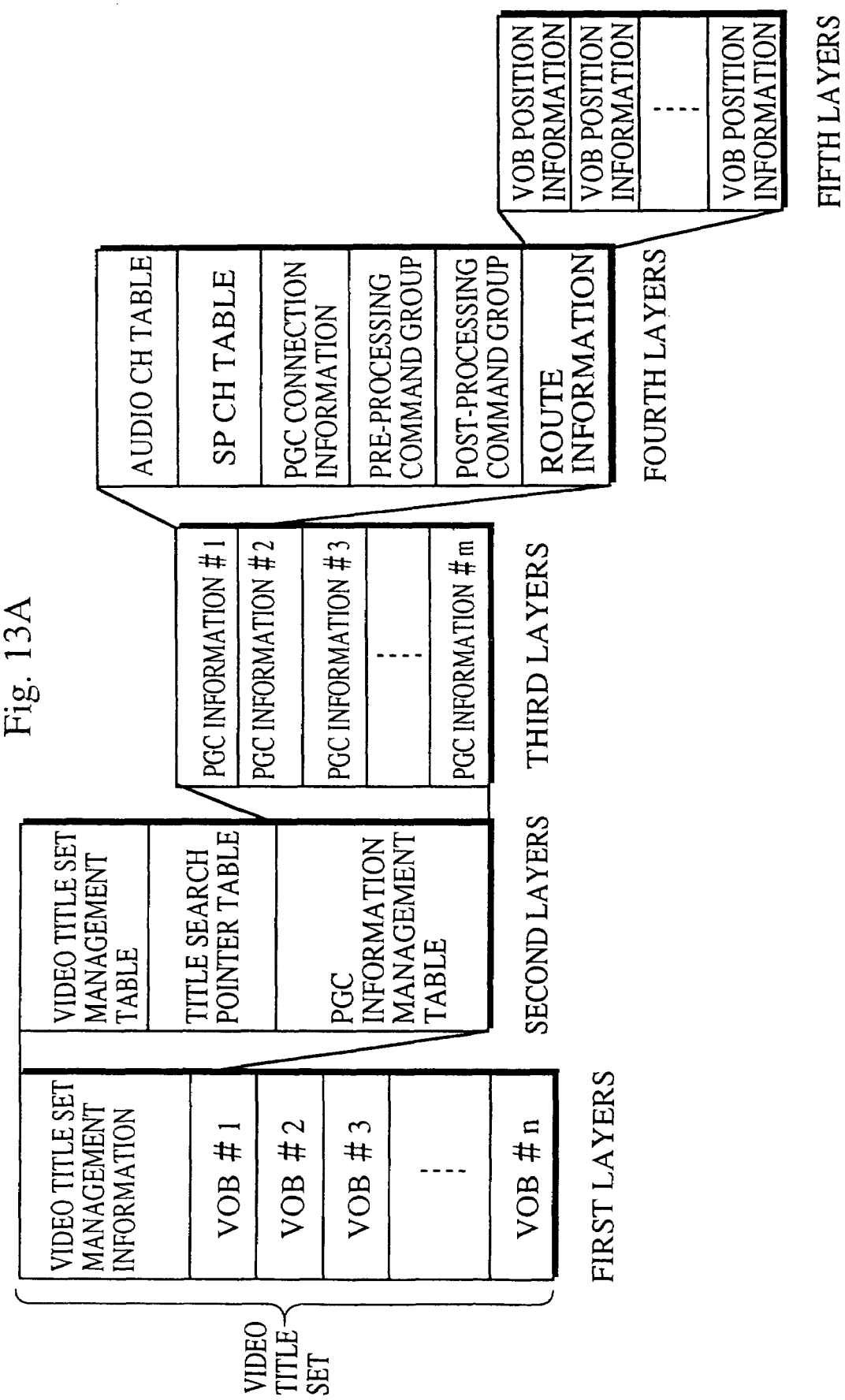
FIG. 13A and FIG. 13B show the construction of the Video Title Set management information.

FIG. 13A shows the construction of the Video Title Set management information.

The Video Title Set management information is comprised of a Video Title Set management table, a title search pointer table, and a PGC information management table.

The Video Title Set management table, being header information of the Video Title Set, stores pointers pointing to the PGC information management table and the title search pointer table.

The title search pointer table stores a pointer pointing to the location of the PGC information which is executed first when the present title (e.g. an interactive movie) is reproduced.

Figure 14:
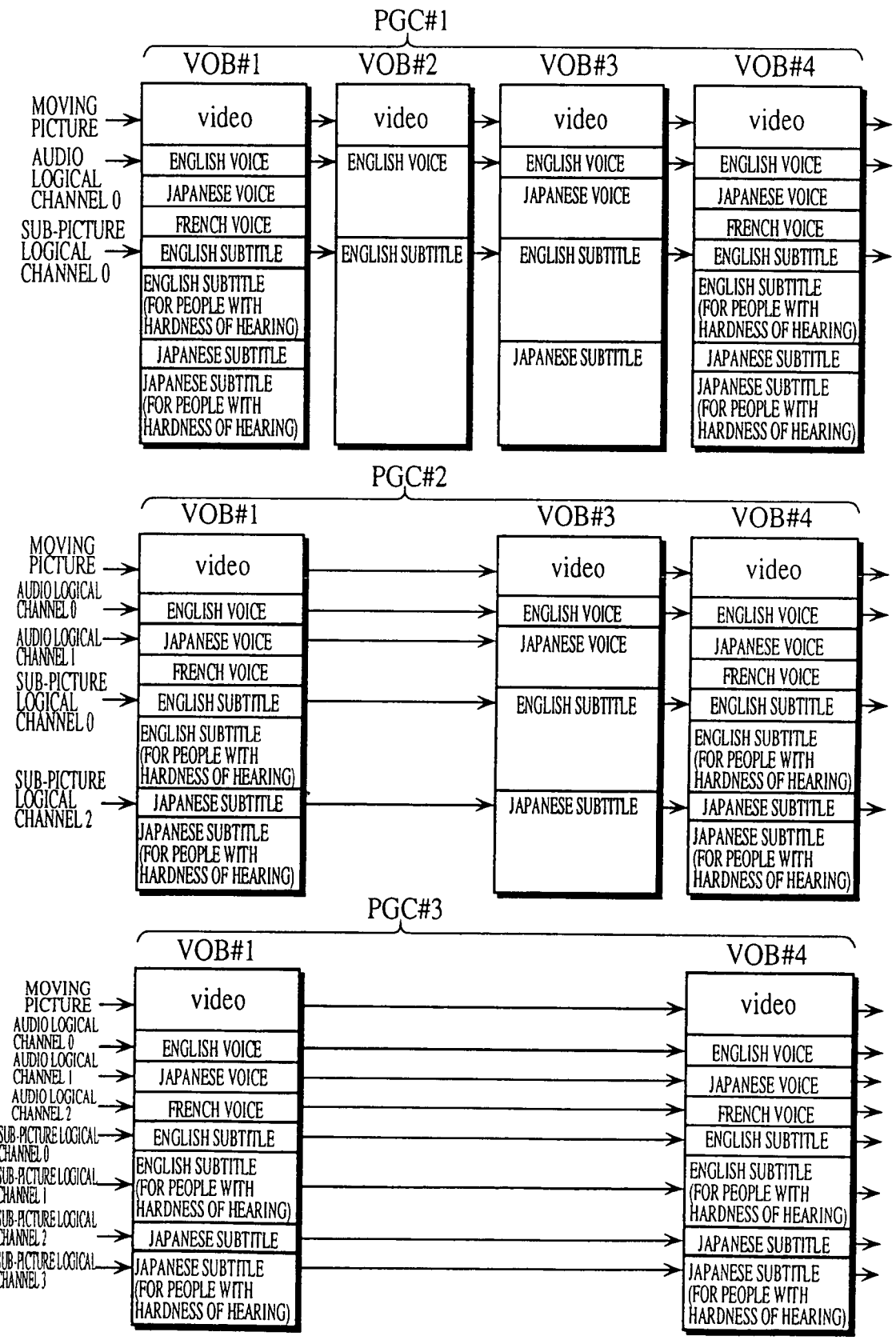
FIG. 14 shows PGCs.

The PGC information management table is used to achieve the reproduction of a plurality of VOBs selected arbitrarily in an arbitrary order, the VOBs being stored in the present Video Title Set. The PGC information management table manages the plurality of VOBs in units of PGCs. Each PGC includes a plurality of arbitrarily selected VOBs in an arbitrary order. FIG. 14 shows PGCs. Suppose the present Video Title Set includes VOBs #1-4. PGC #1 of FIG. 14 indicates a reproduction route in which the VOBs are reproduced in the order of VOB #1, VOB #2, VOB #3, VOB #4. PGC #2 indicates a reproduction route in which the VOBs are reproduced in the order of VOB #1, VOB #3, VOB #4. PGC #3 indicates a reproduction route in which the VOBs are reproduced in the order of VOB #1, VOB #4.

The PGC information management table, as shown in FIG. 13A, includes a plurality pieces of PGC information #1-#m.

The PGC information specifies a plurality of VOBs, an order of reproducing the plurality of VOBs, a next PGC, and a rotation between the audio and sub-picture logical channels and the audio and sub-picture physical channels. Each piece of PGC information is, as shown in FIG. 13A, comprised of an audio channel table, a sub-picture channel table, a PGC connection information, a pre-processing command group, a post-processing command group, and a route information.

The route information is comprised of a plurality pieces of VOB position information which are arranged in the order of reproduction. The route information of PGC information #1, for example, is comprised of the four pieces of VOB position information respectively corresponding to VOB #1-4. Each piece of VOB position information includes the logical address of the first sector of a VOB and the number of all the sectors assigned to the VOB.

The post-processing command group includes at least a command which is executed after the present PGC is reproduced. The button commands, which can be included in the Highlight Information, can also be included in the post-processing command group. Instruction "CmpRegLink" in the post-processing command group of PGC #1, for example, performs a conditional branch from PGC #1 to another PGC.

The pre-processing command group includes at least a command which is executed before the present PGC is reproduced. The button commands can also be included in the pre-processing command group. Instruction "SetReg," for example, may be used to set an initial value in a register.

The PGC connection information includes the PGC number of the next PGC to be reproduced. This information is ignored when the present PGC branches to another PGC with the execution of a branch command (e.g. instruction "CmpRegLink") in the post-processing command group.

The audio channel table (hereinafter referred to as audio CH table) shows the relation between the audio logical channel numbers and the audio physical channel numbers of the present PGC. This table also shows whether the audio logical channels are permitted to be reproduced. The audio logical channel numbers are assigned so that the audio channels can be identified even when the audio channels are dealt with by a plurality of PGCs. The audio CH table is provided to secure the continuity of the audio reproduction in such a case where VOBs of the present PGC have different numbers of audio physical channels, or where VOBs of the present PGC have the same number of audio physical channels but have different physical channel numbers. Without this table, some malfunctions may be generated. Suppose the Japanese voice is selected and currently reproduced for VOB #1 of PGC #1 shown in FIG. 14. The voice output may stop for the next VOB #2 since VOB #2 does not include the Japanese voice. For another case, suppose VOBs #1 and #2 have different physical channel numbers for the English voice and that the English voice is selected and is currently reproduced for VOB #1. In this case, another language may be reproduced for the next VOB #2 due to the difference in the physical channel numbers of the English voice. The audio CH table is included to delete such malfunctions.

The sub-picture channel table (hereinafter referred to as SPCH table) has almost the same function as the audio CH table and is not explained in detail here.

<Construction of Audio CH Table and SPCH Table>

Figure 13B:
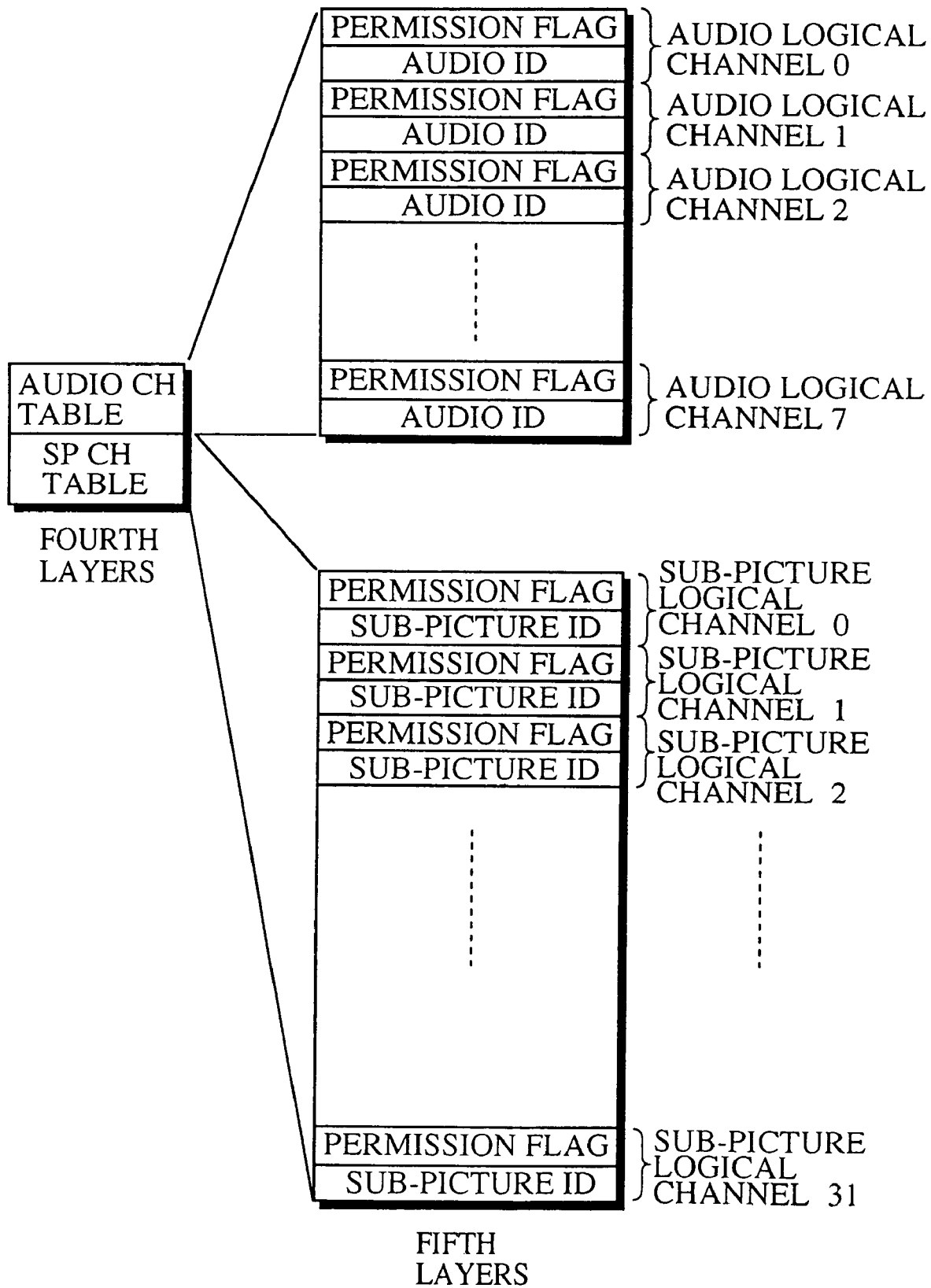

FIG. 13B shows the construction of the CH table and the SPCH table.

As shown in the drawing, the audio CH table is comprised of eight pairs of a permission flag and an audio ID, the pairs respectively corresponding to audio logical channels 0-7. The permission flag specifies whether the audio logical channel is permitted to be reproduced. The audio ID specifies an audio physical channel. More specifically, the audio ID is equal to the sub-stream ID of the audio pack shown in FIG. 6 or the lower three bits of the sub-stream ID. If the permission flag is set, it indicates that the reproduction of the audio physical channel, which is specified by the audio ID of the same pair, is permitted; if the permission flag is reset, it indicates that the reproduction of the audio physical channel is not permitted.

The SPCH table is comprised of 32 pairs of a permission flag and a sub-picture ID, the pairs respectively corresponding to sub-picture logical channels 0-31. The sub-picture ID specifies a sub-picture physical channel. More specifically, the sub-picture ID is equal to the sub-stream ID of the sub-picture pack shown in FIG. 7 or the lower five bits of the sub-stream ID. If the permission flag is set, it indicates that the reproduction of the sub-picture physical channel, which is specified by the sub-picture ID of the same pair, is permitted; if the permission flag is reset, it indicates that the reproduction of the sub-picture physical channel is not permitted.

The audio CH table and the SPCH table are set for each PGC. As a result, it is possible for the title creator to set logical channels correspond to arbitrary physical channels for each PGC.

Figure 15:
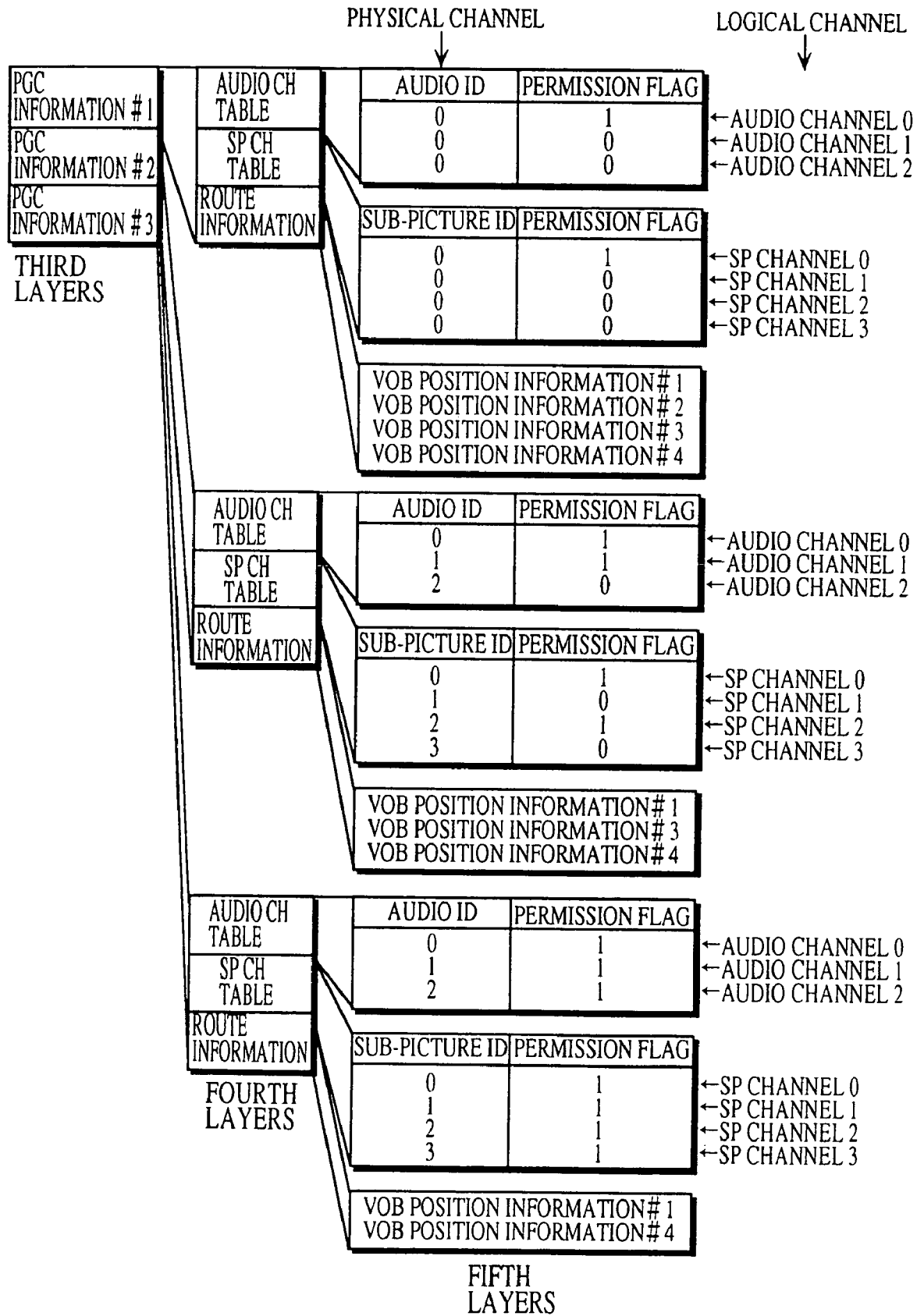
FIG. 15 shows examples of the audio CH tables and SPCH tables.

FIG. 15 shows examples of the audio CH tables and SPCH tables of the PGC information for PGCs #1-3 shown in FIG. 14.

FIG. 15 also shows that the route information of PGC information #1 shown in FIG. 14 includes the VOB position information for VOBs #1, #2, #3, and #4.

The audio CH table of PGC information #1 indicates that audio logical channels 0, 1, and 2 correspond to audio physical channel 0 (audio ID=0). Furthermore, the permission flag of only audio logical channel 0 is set, namely, "1," while the permission flags of audio logical channels 1 and 2 are reset, namely, "0". With such setting of the audio CH table, only audio physical channel 0 (English voice) is reproduced and the other audio physical channels are not reproduced during PGC #1. As a result, even if the user requests to change the audio logical channel during the reproduction of PGC #1, audio logical channels other than audio logical channel 0 are not reproduced.

The SPCH table of PGC information #1 indicates that sub-picture logical channels 0, 1, 2, and 3 correspond to sub-picture physical channel 0 (sub-picture ID=0). Furthermore, the permission flag of only sub-picture logical channel 0 is set, namely, "1," while the permission flags of sub-picture logical channels 1, 2, and 3 are reset, namely, "0." With such setting of the SPCH table, only sub-picture physical channel 0 (English subtitle) is reproduced and the other sub-picture physical channels are not reproduced for PGC #1.

FIG. 15 also shows that the route information of PGC information #2 includes the VOB position information for VOBs #1, #3, and #4. The audio CH table and the SPCH table of PGC information #2 set as shown in FIG. 15 allow, during PGC #2, the reproduction of audio physical channel 0 (English voice), audio physical channel 1 (Japanese voice), sub-picture physical channel 0 (English subtitle), and sub-picture physical channel 2 (Japanese subtitle).

FIG. 15 also shows that the route information of PGC information #3 includes the VOB position information for VOBs #1 and #4. The audio CH table and the SPCH table of PGC information 113 set as shown in FIG. 15 allow, during PGC #3, the reproduction of audio physical channel 0 (English voice), audio physical channel 1 (Japanese voice), audio physical channel 2 (French voice), sub-picture physical channel 0 (English subtitle), sub-picture physical channel 1 (English subtitle for people with hardness of hearing), sub-picture physical channel 2 (Japanese subtitle), and sub-picture physical channel 3 (Japanese subtitle for people with hardness of hearing).

As described above, the audio CH table and the SPCH table adjust the reproduction of channels when VOBs of the PGC have different numbers of physical channels, such as the case of VOBs #1, #2, and #3 above. The logical channels are related to physical channels even if the number of physical channels differs between the audio CH table and the SPCH table. It is also possible to assign different physical channels to the same logical channels for each PGC, which is not the case shown in FIG. 15. It is also possible to prevent desired logical channels to be reproduced with the use of the permission flag.

<Appearance of Reproduction System>

Figure 16:
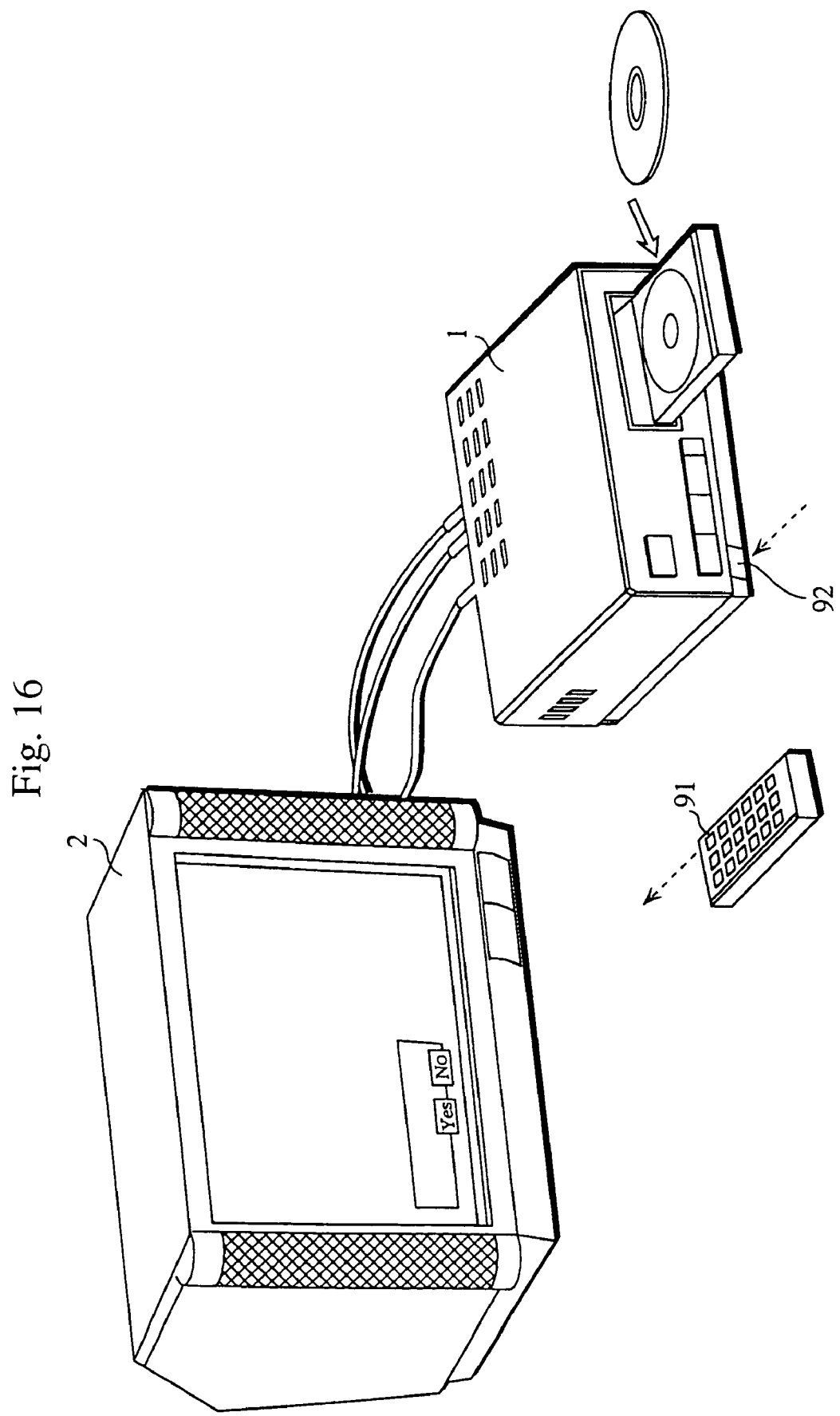
FIG. 16 shows the appearances of the reproduction system of the embodiment.

FIG. 16 shows the appearances of the present reproduction system. The system is comprised of disc reproduction apparatus 1, display monitor 2, and remote controller 91.

Disc reproduction apparatus 1 reproduces the optical disc (DVD) according to instructions sent from remote controller 91 and outputs picture signals and audio signals. The instructions from remote controller 91 are received by remote control receiving unit 92.

Display monitor 2 displays pictures and outputs voices and sounds based on the picture signals and audio signals sent from disc reproduction apparatus 1. The display monitor may be a general TV display.

<Appearance of Remote Controller>

Figure 17:
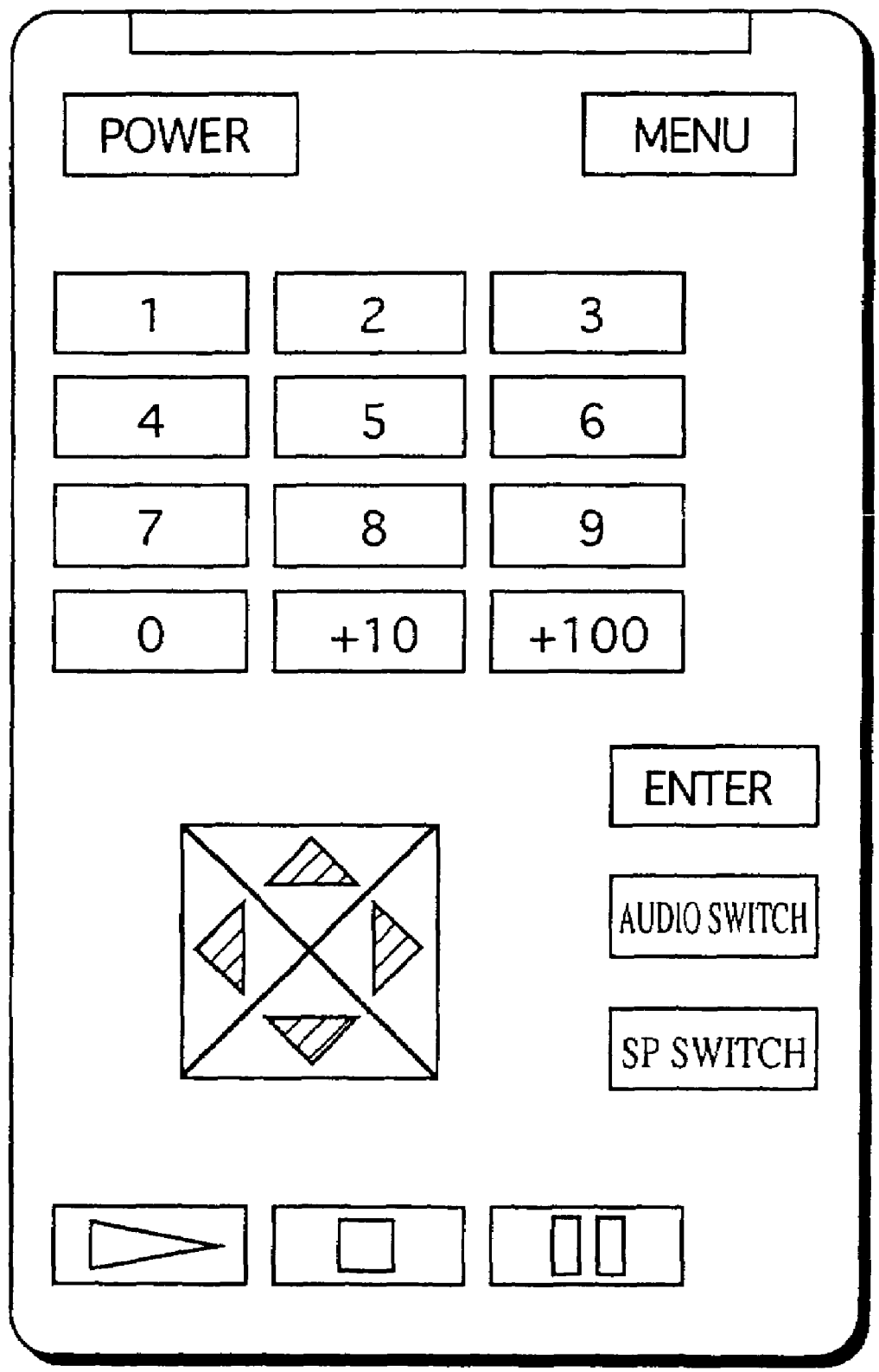
FIG. 17 shows the operation panel on remote controller 91.

FIG. 17 shows the operation panel on remote controller 91. Of the keys shown in the drawing, only the keys relevant to the present invention are described. MENU key is pressed to let the video manager call the system menu when a title such as an interactive movie is reproduced. Ten keys and cursor (arrow) keys are used to select an item in the menu. ENTER key is used to determine the selected item. AUDIO SWITCH key is used to change the audio channels. SP SWITCH key is used to change the sub-picture channels. The remote controller also includes keys which are generally set in AV players.

<Construction Disc Reproduction Apparatus>

Figure 18:
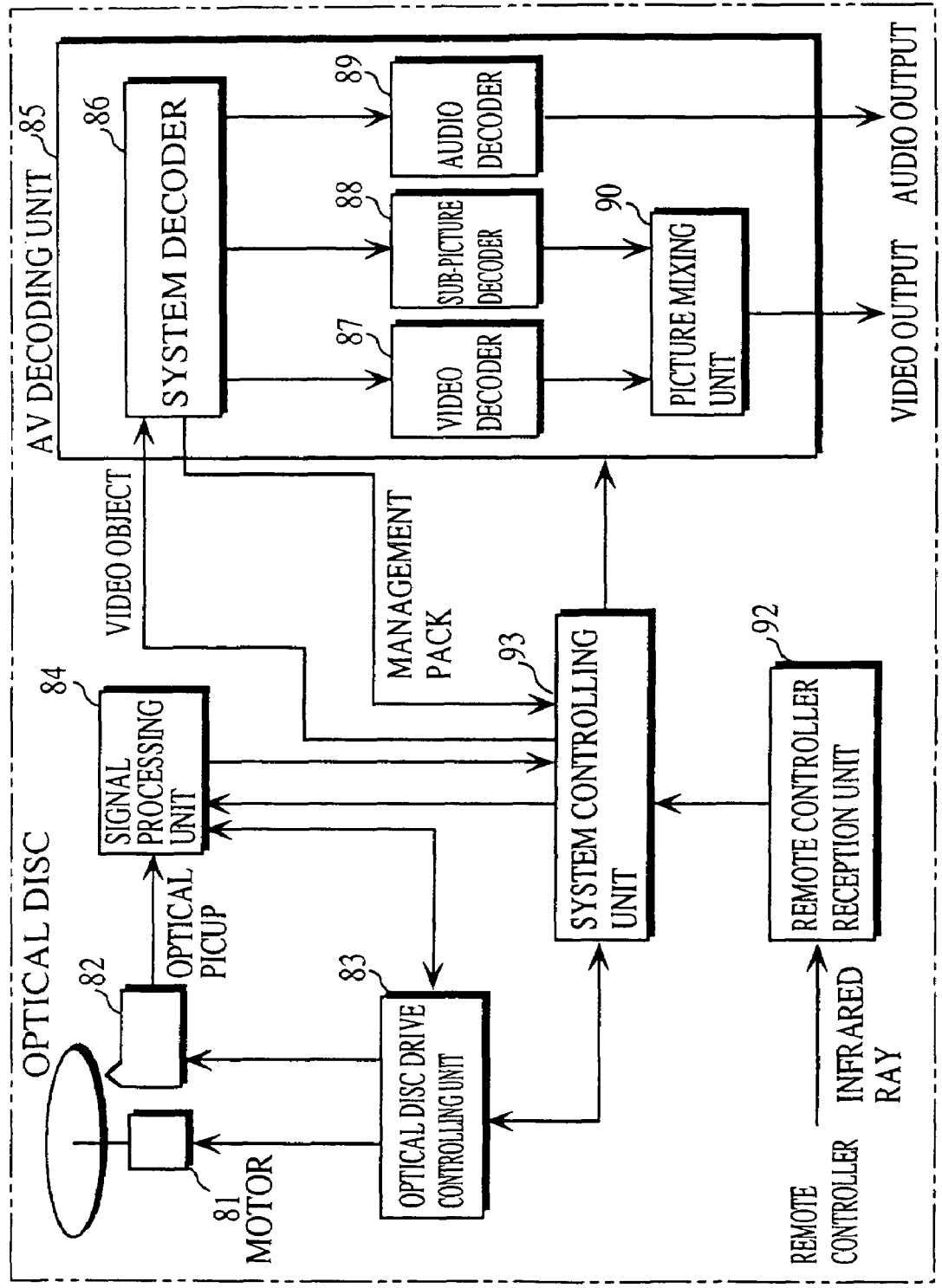
FIG. 18 is a block diagram showing the construction of the disc reproduction apparatus.

FIG. 18 is a block diagram showing the construction of disc reproduction apparatus 1. Disc reproduction apparatus 1 includes motor 81, optical pickup 82, optical disc drive controlling unit 83, signal processing unit 84, AV decoding unit 85, remote control receiving unit 92, and system controlling unit 93. AV decoding unit 85 comprises system decoder 86, video decoder 87, sub-picture decoder 88, audio decoder 89, and picture mixing unit 90.

Optical disc drive controlling unit 83 controls a system which includes motor 81 for driving the disc and optical pickup 82 for reading signals from the disc. Specifically, optical disc drive controlling unit 83 adjusts the motor speed according to a track position specified by system controlling unit 93, moves optical pickup 82 by controlling the actuator of the pickup, then after a correct track is detected by servo control, waits for a desired physical sector and reads signals continuously starting from a desired position.

Signal processing unit 84 converts the signals read through optical pickup 82 into digital data by processing the signals with amplification, waveform shaping, conversion to binary, demodulation, error correction, etc., then stores the processed data in a buffer memory (not shown in the drawings) in system controlling unit 93. Of the data stored in the buffer memory, the video title set management information is retained by system controlling unit 93 and the VOBs are transferred to system decoder 86 via the buffer memory by the control by system controlling unit 93.

AV decoding unit 85 converts the VOBs, after processing by signal processing unit 84, into the video signals and audio signals.

System decoder 86 identifies the stream ID and sub-stream ID of each logical block (pack) of the VOBs transferred from the buffer memory and outputs the video data to video decoder 87, the audio data to audio decoder 89, the sub-picture data to sub-picture decoder 88, and the management pack to system controlling unit 93. In this process, system decoder 86 outputs only data of the kinds which correspond to the channel numbers specified by system controlling unit 93. The data of the channels not specified are discarded.

Video decoder 87 decodes and extends the video data sent from system decoder 86 and outputs the data to picture mixing unit 90 as digital video signals.

Sub-picture decoder 88 decodes and extends the sub-picture data sent from signal separating unit 86 if the sub-picture data is image data compressed with run length compression, and outputs the sub-picture data to picture mixing unit 90 in the same format as video signals.

Audio decoder 89 decodes and extends the audio data sent from system decoder 86 and outputs the data to picture mixing unit 90 as digital audio signals.

Picture mixing unit 90 outputs video signals after mixing the outputs from video decoder 87 and sub-picture decoder 88 according to the ratio specified by system controlling unit 93. The video signals are input to the display monitor after being converted into analog signals.

<Construction of System Decoder>

Figure 19:
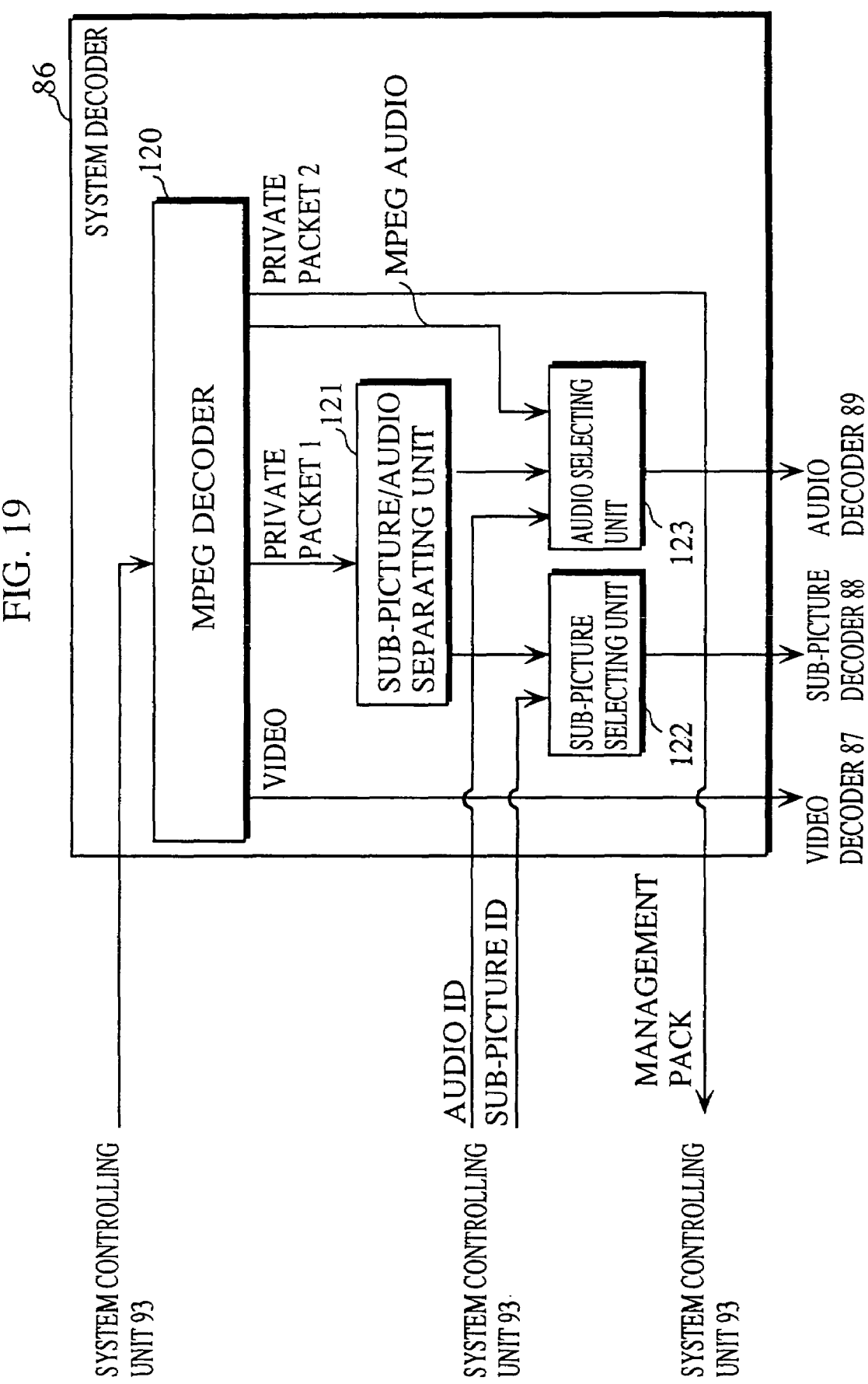
FIG. 19 is a block diagram showing the construction of the system decoder.

FIG. 19 is a block diagram showing the construction of system decoder 86. As shown in the drawing, system decoder 86 comprises MPEG decoder 120, sub-picture/audio separating unit 121, sub-picture selecting unit 122, and audio selecting unit 123.

MPEG decoder 120 determines the types of packets transferred from the buffer memory by checking the stream IDs, and outputs the packet data to respective destinations as follows: video packet to video decoder 87, private packet 1 to sub-picture/audio separating unit 121, private packet 2 to system controlling unit 93, and MPEG audio packet to audio selecting unit 123.

Sub-picture/audio separating unit 121 determines the data type of private packet 1 sent from MPEG decoder 120 by checking the sub-stream ID, and outputs the packet data as follows: sub-picture data to sub-picture selecting unit 122, and audio data to audio selecting unit 123. When this completes, all sub-picture data and audio data are output to sub-picture selecting unit 111 and audio selecting unit 123 respectively.

Sub-picture selecting unit 122, on receiving the sub-picture data from sub-picture/audio separating unit 121, outputs only the sub-picture data of the sub-picture ID specified by system controlling unit 93 to sub-picture decoder 88, and discards the rest of the sub-picture data.

Audio selecting unit 123, on receiving the MPEG audio data from MPEG decoder 120 and the audio data from sub-picture/audio separating unit 121, outputs only the audio data of the audio ID specified by system controlling unit 93 to audio decoder 89, and discards the rest of the audio data.

<Construction of System Controlling Unit>

Figure 20A:
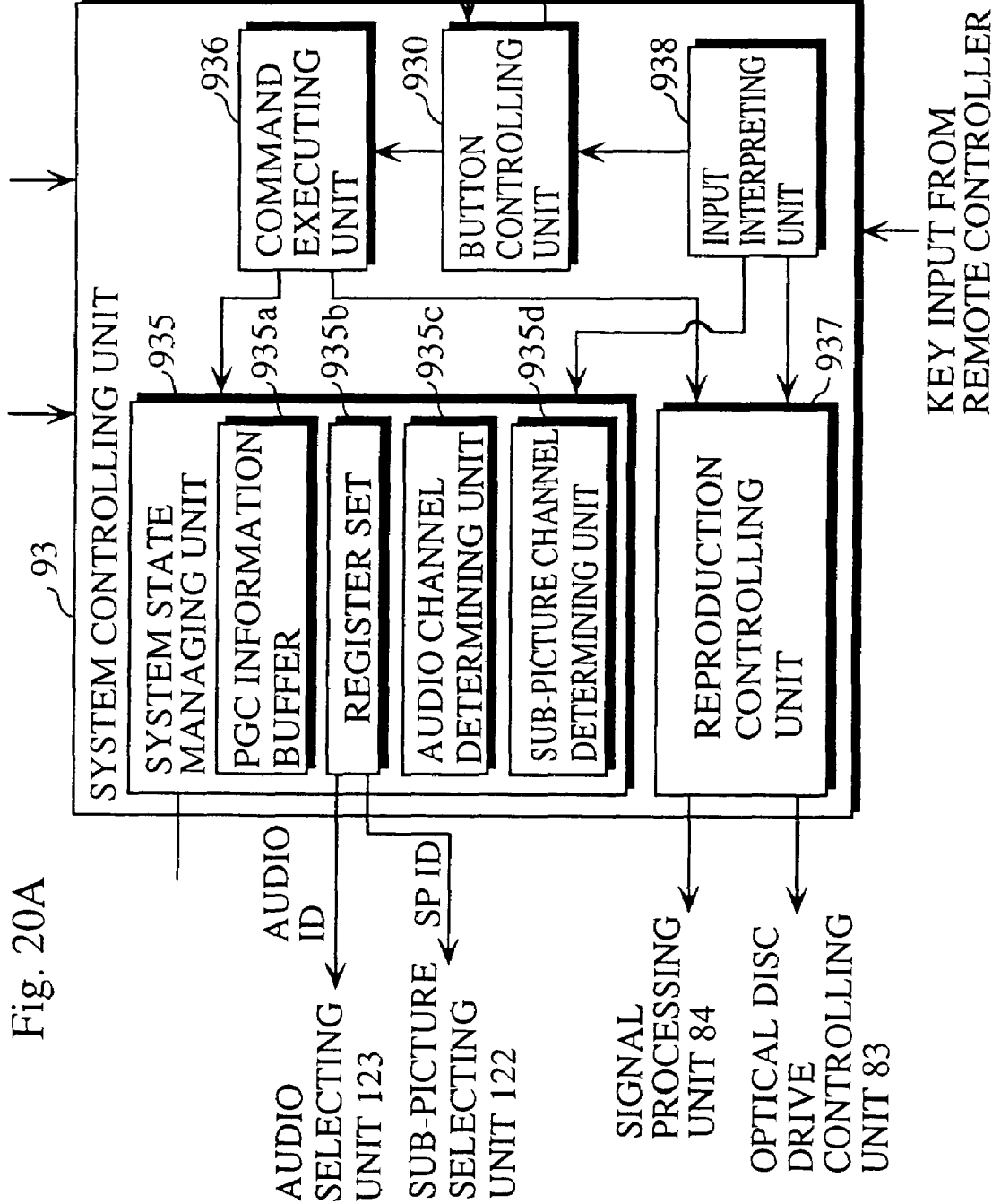
FIG. 20A is a block diagram showing the construction of the system controlling unit.

FIG. 20A is a block diagram showing the construction of system controlling unit 93.

System controlling unit 93 includes button controlling unit 930, system state managing unit 935, command executing unit 936, reproduction controlling unit 937, input interpreting unit 938. System state managing unit 935 includes PGC information buffer 935a, register set 935b, audio channel determining unit 935c, and sub-picture channel determining unit 935d.

Button controlling unit 930, having a buffer, receives a management pack from system decoder 86 and stores the management pack in the buffer. Button controlling unit 930, on receiving from input interpreting unit 938 an instruction input by the user through the remote controller, determines which button in a menu is selected or determined based on the Highlight Information stored in the buffer and instructs sub-picture decoder 88 to highlight the selected or determined button.

System state managing unit 935 includes a buffer (not shown in the drawings) for temporarily storing digital data input from signal processing unit 84. A part of the buffer is used as PGC information buffer 935a for storing the PGC information. If a VOB is input to the buffer, system state managing unit 935 transfers the VOB to system decoder 86. If PGC information is input, system state managing unit 935 retains the information in PGC information buffer 935a.

Register set 935b is comprised of a plurality of registers (in the present embodiment, register set 935b is comprised of 32-bit registers R0 to R31). Register set 935b includes general-purpose registers and dedicated registers. Registers R8-11 are dedicated registers and store logical and physical channel numbers of currently reproduced audio and sub-picture data.

Figure 20B:
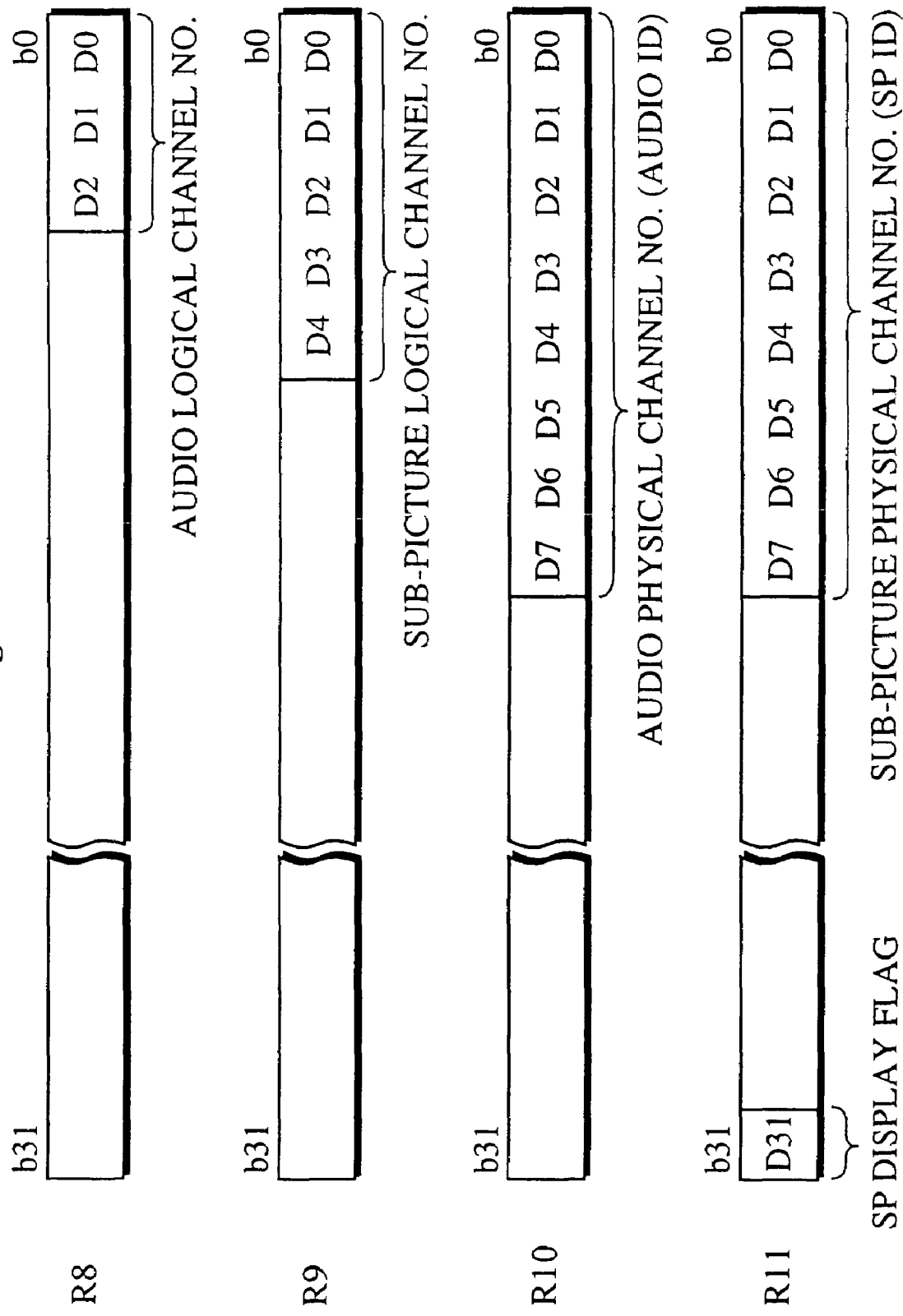
FIG. 20B shows a part of the register set.

FIG. 20B shows the bit assignment of registers R8-11. The lower three bits D2-D0 of R8 store the audio logical channel number.

The lower five bits D4-D0 of R9 store the sub-picture logical channel number.

The lower eight bits D7-D0 of R10 store the audio physical channel number (audio ID). The audio ID is equal to the sub-stream ID of the audio pack as shown in FIG. 6 and is output to audio selecting unit 123.

R11 stores an SP display flag at the most significant bit D32 and the sub-picture physical channel number (sub-picture ID) at lower eight bits D7-D0. The sub-picture ID is equal to the sub-stream ID of the sub-picture pack as shown in FIG. 7 and is output to sub-picture selecting unit 122. The SP display flag indicates, for sub-picture decoder 88, whether the sub-picture data is displayed.

Audio channel determining unit 935c determines the audio physical channel number (audio ID) of the channel to be reproduced by referring to the audio CH table in PGC information buffer 935a and the audio logical channel number in register R8 when: the PGC information in PGC information buffer 935a is updated; input interpreting unit 938 notifies audio channel determining unit 935c of an input by AUDIO SWITCH key; or command executing unit 936 instructs audio channel determining unit 935c to execute instruction "SetSTN." Audio channel determining unit 935c updates the audio logical channel number in R8 and the audio ID in R10 if the above determination changes these pieces of information.

Sub-picture channel determining unit 935d determines the sub-picture physical channel number (sub-picture ID) of the channel to be reproduced by referring to the SPCH table in PGC information buffer 935a and the sub-picture logical channel number in register R9 when: the PGC information in PGC information buffer 935a is updated; input interpreting unit 938 notifies sub-picture channel determining unit 935d of an input by SP SWITCH key; or command executing unit 936 instructs sub-picture channel determining unit 935d to execute instruction "SetSTN." Sub-picture channel determining unit 935d updates the sub-picture logical channel number in R9 and the sub-picture ID in R11 if the above determination changes these pieces of information.

Command executing unit 936 executes the commands in the pre-processing command group immediately before the PGC is reproduced and executes the commands in the post-processing command group immediately after the PGC is reproduced. Command executing unit 936 also executes the button commands issued by button controlling unit 930 during a reproduction of a VOB.

Reproduction controlling unit 937 executes key-input instructions sent by input interpreting unit 938 and controls disc drive controlling unit 83 and signal processing unit 84 and other elements.

Input interpreting unit 938 receives a key code indicating an input key from remote control receiving unit 92 and notifies system state managing unit 935 and reproduction controlling unit 937 of the key input.

<Construction of Sub-Picture Decoder>

FIG. 21 is a block diagram showing the construction of sub-picture decoder 88. As shown in the drawing, sub-picture decoder 88 is comprised of input buffer 881, sub-picture code Generating unit 882, sub-picture display controlling unit 883, sub-picture code conversion table 884, compressed image signal generating unit 885, highlight code conversion table 886, highlight area managing unit 887, sub-picture signal generating unit 888.

Input buffer 881 stores the sub-picture data of the channel selected by sub-picture selecting unit 122 of system decoder 86.

Sub-picture code generating unit 882 decompresses the image data of the input buffer which has been compressed with the run-length compression and converts the data into bit map data in which each pixel is represented by a two-bit code.

Sub-picture display controlling unit 883 performs such image processing as changing the color of image data at display start, display end, and in Karaoke and generates sub-picture code conversion table 884 according to the color information recorded in the sub-picture data.

Compressed image signal generating unit 885 converts the two-bit codes, which represent respective pixels and are output from sub-picture code generating unit 882, into four-bit 16-color codes by referring to sub-picture code conversion table 884 for the sub-picture portions and highlight code conversion table 886 for the highlight portions.

Highlight code conversion table 886 is a color conversion table used to convert 2-bit codes of the highlight portions of the image data into 4-bit codes.

Highlight area managing unit 887 stores start XY coordinates and end XY coordinates of a rectangular highlight display area, the coordinates being read by compressed image signal generating unit 885.

Sub-picture signal generating unit 888 converts the four-bit 16-color codes, which represent respective pixels and are output from compressed image signal generating unit 885, into 16-bit data for about 16 million colors by referring to a mapping table (not shown in the drawings).

<Flow of Reproduction Control by System Controlling Unit 93>

Figure 22:
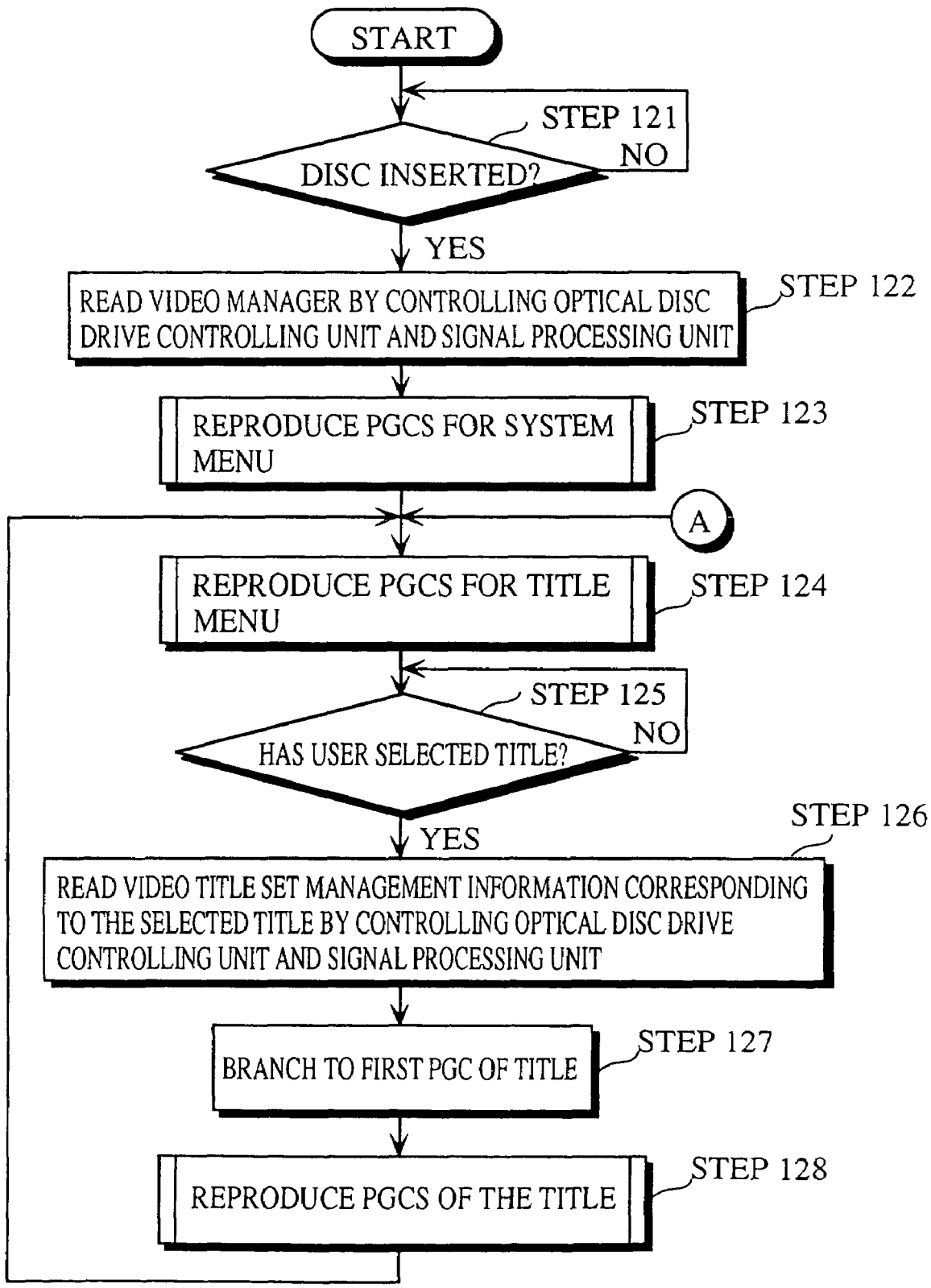
FIG. 22 is a flowchart showing the reproduction control by the system controlling unit.

FIG. 22 is a flowchart showing the reproduction control by system controlling unit 93.

System controlling unit 93, on detecting that the disc has been inserted into the disc reproduction apparatus, controls optical disc drive controlling unit 83 and signal processing unit 84 so that the rotation of the disc is controlled to read data under stable conditions. System controlling unit 93 moves the optical pickup when the disc is under the stable conditions. The lead-in area is read first, then the volume management area. System controlling unit 93 then read the Video Manager shown in FIG. 2 according to the information read from the volume management area (steps 121 and 122). System controlling unit 93 reproduces the PGCs for the system menu (step 123).

System controlling unit 93 reproduces the PGCs for the title menu of the Video Title Set which is selected by the user in the system menu (step 124). System controlling unit 93 detects whether the user has selected a title (step 125). System controlling unit 93 reads the Video Title Set management information corresponding to the selected title (step 126), and branches to the first PGC of the title (step 127). System controlling unit 93 reproduces the PGCs of the title and on completing the reproduction of the PGCs, returns to step 124 (step 128).

<Flow of Reproduction of PGCs>

Figure 23:
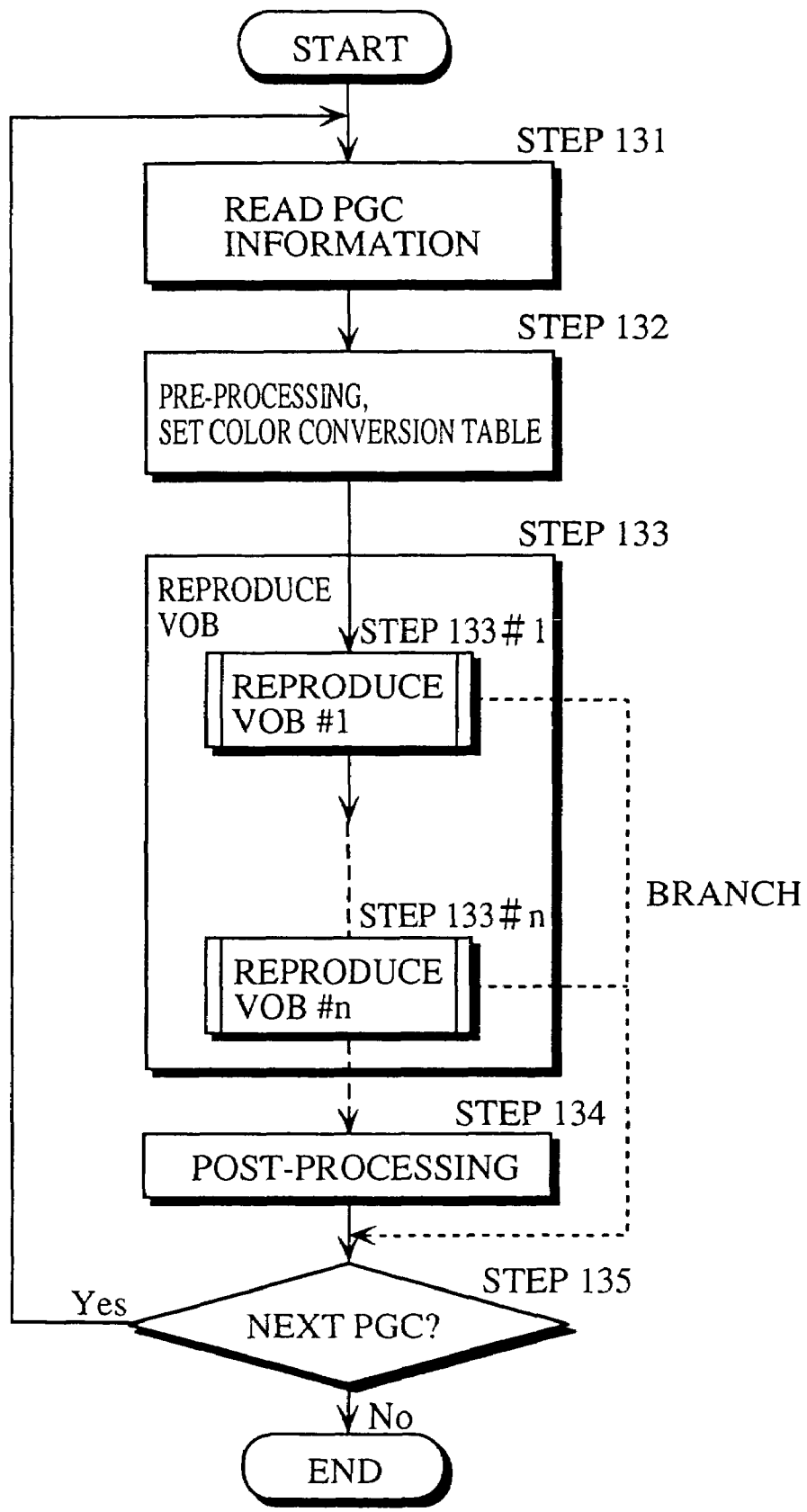
FIG. 23 is a detailed flowchart of step 128 in the flowchart of FIG. 22.

FIG. 23 is a detailed flowchart of step 128 in the flowchart of FIG. 22. This process can also be applied to steps 123 and 124.

System controlling unit 93 reads the PGC information from the Video Title Set management information (step 131). The read PGC information is stored in PGC information buffer 935*a*.

System controlling unit 93 performs an initialization, which includes the execution of the pre-processing command group, according to the PGC information in PGC information buffer 935*a*. The execution of the pre-processing command group achieves initialization of registers and the like.

System controlling unit 93 then fetches a plurality pieces of position information in sequence from the route information in PGC information buffer 935*a* to reproduce the VOBs sequentially (step 133). More specifically, system controlling unit 93 instructs optical disc drive controlling unit 83 and signal processing unit 84 to read the VOBs based on the position information in the route information. The read VOBs are separated into video data and audio data and reproduced by AV decoding unit 85. As a result, the moving pictures and sub-pictures are displayed on a monitor screen (not shown in the drawings) and the voices are output. If a button command of branch instruction is executed during the reproduction of a VOB, control branches to the PGC specified by the branch instruction (steps 135 to 131). The post-processing command group is executed when all the VOBs have been reproduced (step 134). If there is another PGC to be reproduced, the PGC is reproduced (steps 135 to 131). The PGC to be reproduced next is specified by a branch instruction in the post-processing command group or the PGC connection information in the PGC information.

<Reproduction of VOB>

Figure 24:
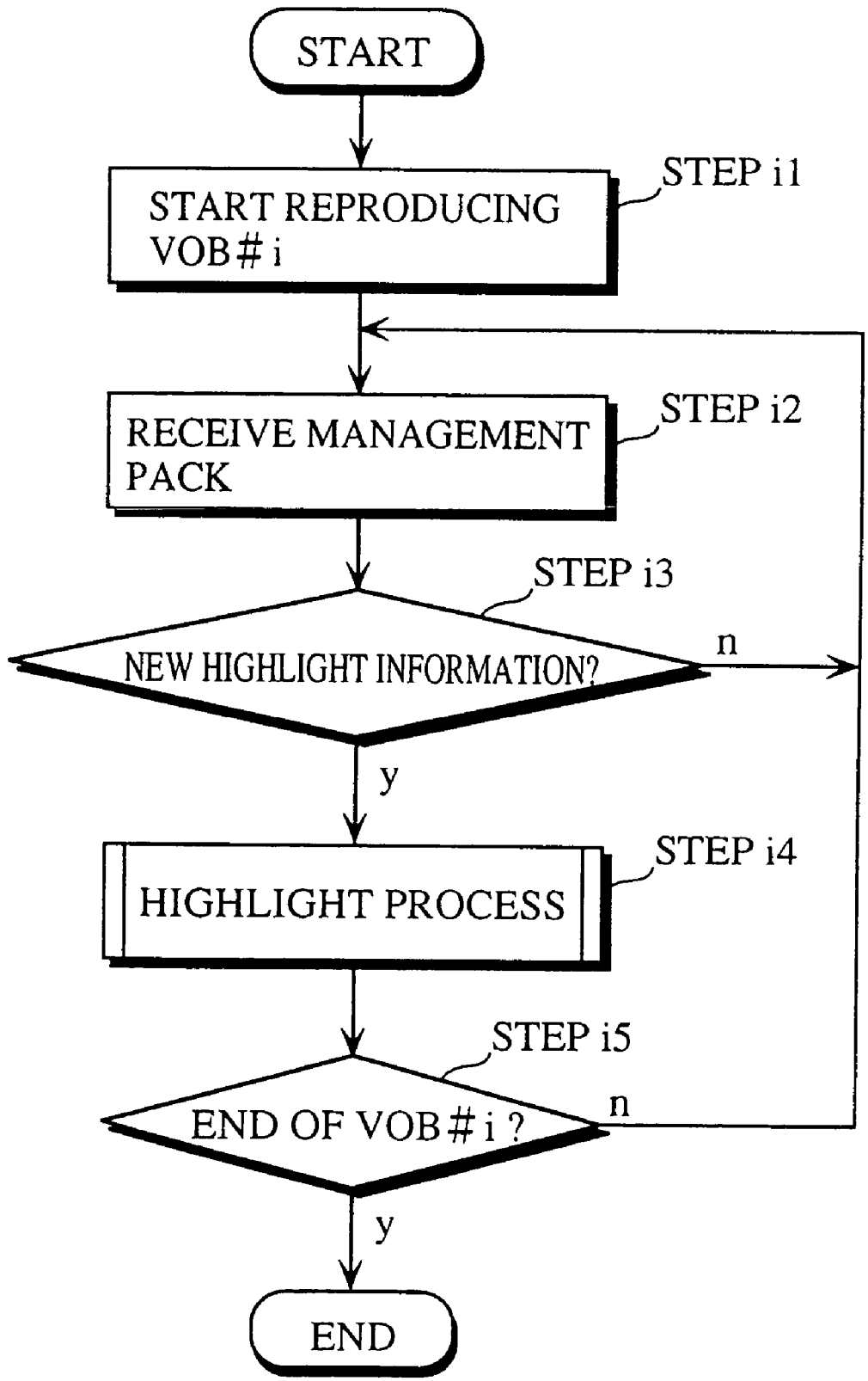
FIG. 24 is a detailed flowchart of a reproduction of a VOB in FIG. 23.

FIG. 24 is a detailed flowchart of a reproduction of a VOB in step 133 in FIG. 23.

System controlling unit 93 instructs optical disc drive controlling unit 83 and signal processing unit 84 to read the digital data sequence of VOB#i based on the i th piece of position information in the route information, where "i" is a number in a range from "0" to "n" (step i1). The read digital data sequence is sequentially input to system decoder 86 via system controlling unit 93. System decoder 86 decodes and divides the digital data sequence into the video pack, audio and sub-picture packs of specified channels, and the management pack, then outputs these packs to video decoder 87, sub-picture decoder 88, audio decoder 89, and button controlling unit 930 of system controlling unit 93. This enables the reproduction of moving picture data, audio data, and sub-picture data. The management pack is input to button controlling unit 930 at intervals of about 0.5 seconds.

Button controlling unit 930, on receiving the management pack (step i2), judges whether a new piece of Highlight Information has been set in the management pack by referring to the highlight state shown in FIG. 10 (step i3). Here, button controlling unit 930 stores the piece of Highlight Information in an internal buffer if the piece is new. Button controlling unit 930 performs a highlight process based on the Highlight Information in the internal buffer (step i4). The highlight process is an interactive control based on the highlight display and Highlight Information. The highlight process is shown in FIG. 25.

System controlling unit 93 judges whether the end of VOB#i is detected based on the total number of sectors in VOB#i by referring to the position information (step i5). System controlling unit 93 returns to step i2 to repeat the above steps if the end of VOB#i is not detected, ends the reproduction of VOB#i if detected.

<Highlight Process>

Figure 25:
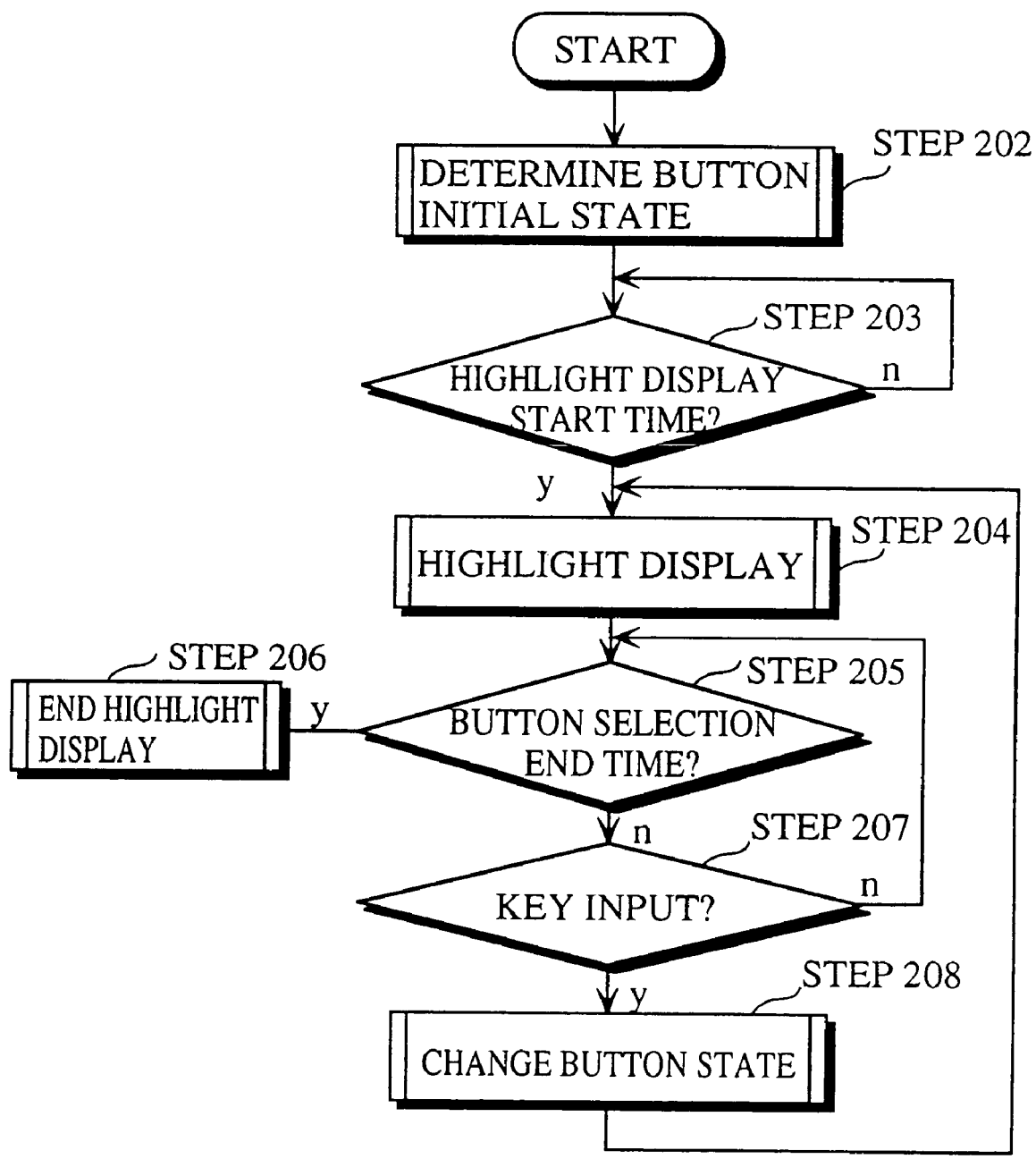
FIG. 25 is a detailed flowchart of the highlight process in FIG. 24.

FIG. 25 is a flowchart showing the highlight process (step i4 of FIG. 24).

Button controlling unit 930 determines a button initial state according to the compulsory selection button number of the Highlight Information stored in the internal buffer (step 202). Button controlling unit 930 judges whether it is a highlight start time by checking to see whether the system time of the disc reproduction apparatus matches the highlight start time (step 203). When it is the highlight start time, button controlling unit 930 instructs sub-picture decoder 88 to perform the highlight display (step 204). In the succeeding steps, button controlling unit 930 instructs sub-picture decoder 88 to update the highlight display every time the button state changes by a user key input (steps 207 and 208). When it is a button selection end time (step 205), button controlling unit 930 instructs sub-picture decoder 88 to end the highlight display (step 206).

<Processing of Button State Change>

Figure 26:
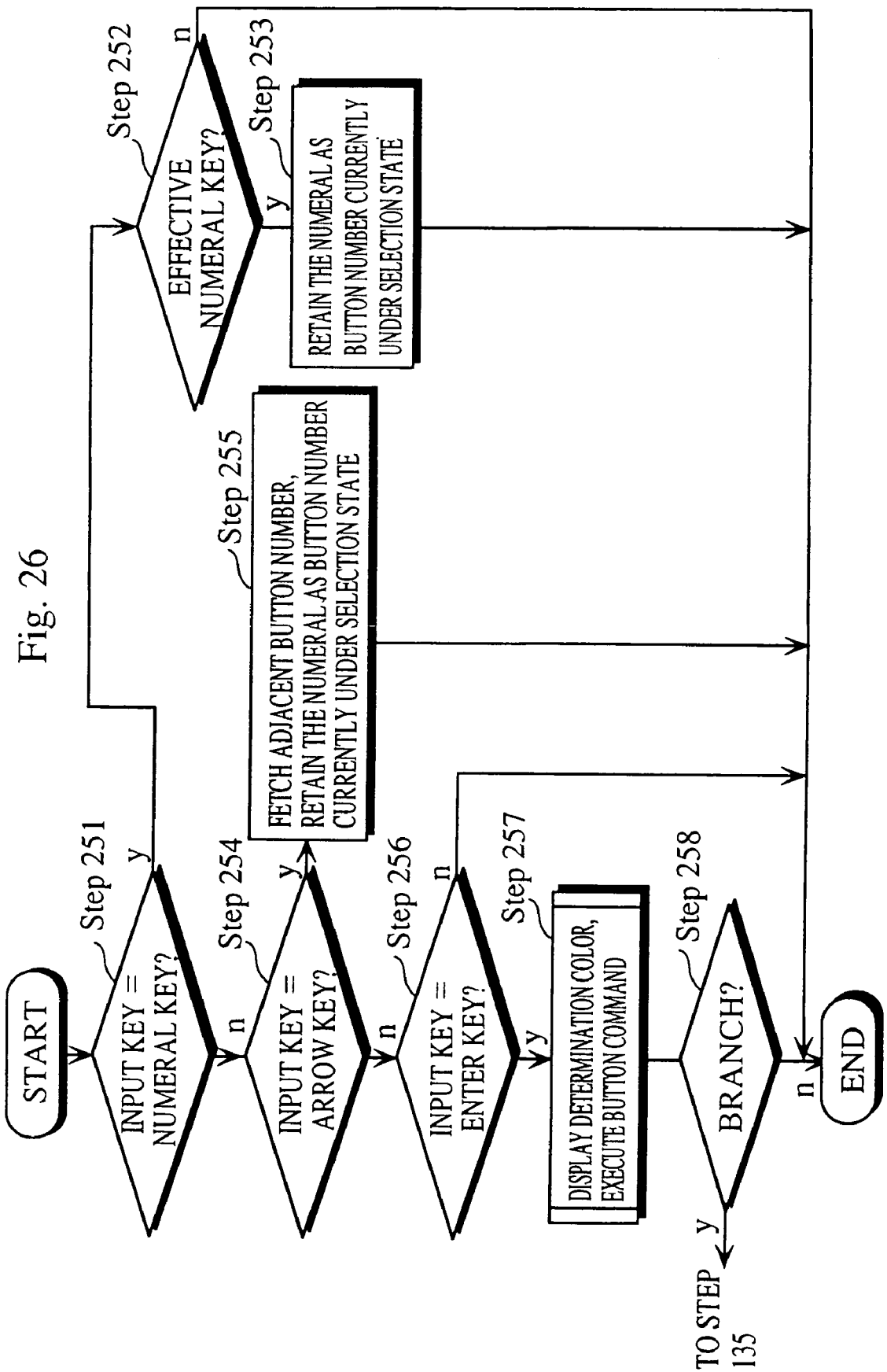
FIG. 26 is a detailed flowchart of the process of handling the button state change in FIG. 25.

FIG. 26 is a detailed flowchart of step 208 of FIG. 25 showing the process of handling the button state change.

Button controlling unit 930, on receiving a key code from input interpreting unit 938, identifies the input key from the key code (steps 251, 254, 256).

Button controlling unit 930 judges whether the input key is a numeral key (step 251). If the input key is a numeral key, button controlling unit 930 judges whether the numeral key input is effective, namely, whether the numeral corresponds to a button number in the Highlight Information stored in the internal buffer (step 252). If effective, button controlling unit 930 retains the numeral as the button number currently selected, or the button number under selection state (step 253).

Button controlling unit 930 judges whether the input key is an arrow key (step 254). If the input key is an arrow key, button controlling unit 930 fetches an adjacent button number by referring to the adjacent button information in the Highlight Information stored in the internal buffer and retains the number as the button number currently selected (step 255).

Button controlling unit 930 judges whether the input key is ENTER key (step 256). If the input key is ENTER key, button controlling unit 930 retains the currently selected number as a determined button number, or the button number under determination state, instructs the sub-picture decoder to change the color of the button to the determination color, and executes the button command corresponding to the determination state (step 257).

Button controlling unit 930 judges whether the button command is a branch instruction such as instruction "LINK" (step 258). If the button command is a branch instruction, control returns to step 135 of FIG. 23.

<Flow of Audio Channel Determining Unit>

Figure 27:
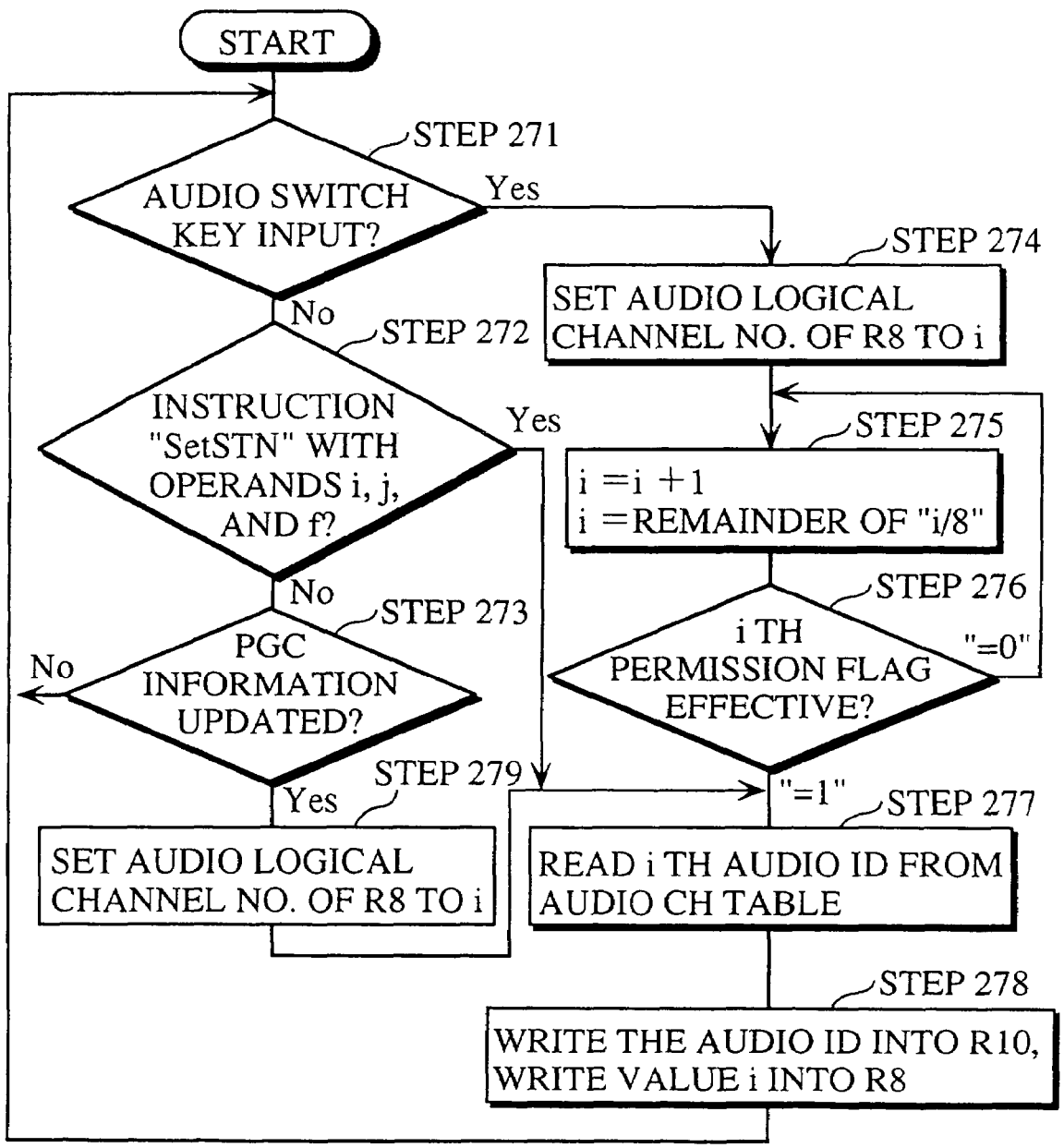
FIG. 27 is a flowchart showing the procedure of the audio channel determining unit.

FIG. 27 is a flowchart showing the procedure of audio channel determining unit 935c.

Audio channel determining unit 935c, as shown in the flowchart, makes judgements all the time: (1) on whether the AUDIO SWITCH button has been pressed which is achieved by means of monitoring such notification from input interpreting unit 938 (step 271), (2) on whether command executing unit 936 has instructed to execute instruction "SetSTN" (step 272), and (3) on whether the PGC information of PGC information buffer 935a has been updated (step 273).

Audio channel determining unit 935c, on judging that the AUDIO SWITCH button has been pressed, sets the audio logical channel number of register R8 to variable "i" (step 274), increments "i" by one, then substitutes the remainder of "i/8" for "i" (step 275), where the remainder is obtained so that "i" does not exceed the range from 0 to 7. Audio channel determining unit 935c makes a judgement on whether the i th permission flag of the audio CH table is effective ("1") (step 276) and repeats step 275 until the i th permission flag is effective. Audio channel determining unit 935c, on judging that the permission flag is effective, reads the i th audio ID from the audio CH table (step 277), writes the audio ID into register R10 as the audio physical channel number, and writes the value of i into register R8 as the audio logical channel number (step 278).

Suppose, currently, audio logical channels 1, 2, and 4 are effective and audio logical channel 3 is ineffective, and that R8 indicates that the audio logical channel number is 1. Here, if AUDIO SWITCH key is pressed, the channel is switched from 1 to 2 . If AUDIO SWITCH key is pressed again, the channel is switched from 2 to 4 since channel 3 is ineffective. As is understood from this, an effective channel is selected in sequence each time the user press AUDIO SWITCH key.

Audio channel determining unit 935c, on judging that command executing unit 936 has instructed to execute instruction "SetSTN," detects that the instruction has audio logical channel number #i as an operand, reads the i th audio ID of the audio CH table (step 277), writes the audio ID into register R10 as the audio physical channel number, and writes the value of i into register R8 as the audio logical channel number (step 278). In this way, the audio logical channel number is switched to the number specified in the instruction "SetSTN."

Audio channel determining unit 935c, on judging that the PGC information of PGC information buffer 935a has been updated, reads the value from register R8 as value "i," reads the i th audio ID from the audio CH table (step 277), writes the audio ID into register R10 as the audio physical channel number, and writes the value of i into register R8 as the audio logical channel number (step 278). In this way, the change of the audio CH table between the preceding PGC and the current PGC can be dealt with.

<Flow of Sub-Picture Channel Determining Unit>

Figure 28:
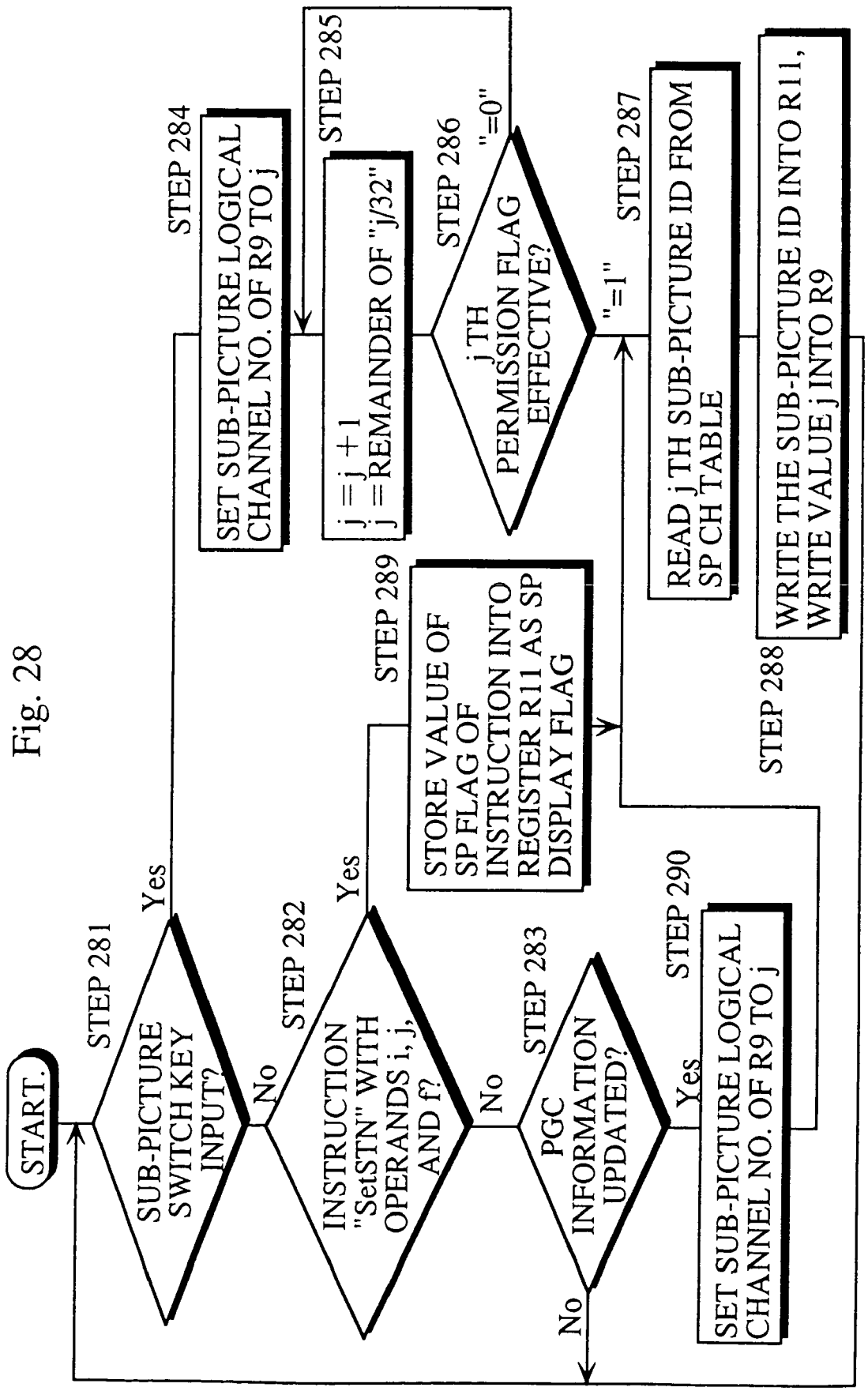
FIG. 28 is a flowchart showing the procedure of the sub-picture channel determining unit.

FIG. 28 is a flowchart showing the procedure of sub-picture channel determining unit 935d.

Since this flow overlaps the flow of audio channel determining unit 935c, only different parts are described below.

One of the different parts is that registers R9 and R11 are updated, and another is that the SP display flag is stored in R11 when command executing unit 936 executes instruction "SetSTN." In the latter case, sub-picture channel determining unit 935d stores the value of SP flag specified as an operand of the instruction into register R11 as the SP display flag (step 289). This achieves the switch between on and off of displaying sub-pictures.

<Operation>

The following is the description of the operation of the multimedia optical disc and the disc reproduction apparatus in the present embodiment.

<First Operation>

Suppose the optical disc includes three video title sets, namely, movie A, movie B, and a game and a video manager, the video manager storing the PGC of system menu M101 as shown in FIG. 9. Suppose also that the video title set of movie A prepares theater, no-cut, and TV on-air versions as shown in FIG. 14 and title menus M102-M106 as shown in FIG. 9.

When the disc reproduction apparatus is powered on, system menu M101 is reproduced first (see steps 121-123 of FIG. 22). System menu M101 includes three menu items, namely, MOVIE A, MOVIE B, and GAME.

If the user selects button 0 (movie A) in the system menu, title menu M102 of the video title set of movie A is reproduced (step 124 of FIG. 22).

The user can select any of the theater, no-cut, and TV on-air versions in title menu M102 of FIG. 9. Title menus M103-M106 provide menu items of the audio and sub-picture channels which can be selected by the user, for each of the theater, no-cut, and TV on-air versions.

If the user selects the no-cut version, PGC #1 is reproduced. As shown in FIG. 14, PGC #1 includes VOBs #1, #2, #3, and #4 to be reproduced in sequence, the VOBs having different numbers of audio physical channels and sub-picture physical channels. According to the audio CH table and the SPCH table of FIG. 15, only audio logical channel 0 (English voice) and sub-picture logical channel 0 (English subtitle) are allowed to be reproduced. This prohibits other audio and sub-picture logical channels from being reproduced even during the reproduction of VOB #2 in PGC #1. If the user presses AUDIO SWITCH key during the reproduction of the movie A no-cut version, for example, voices other than English are not reproduced since the permission flags of other audio channels are "0" (FIG. 27).

If the user selects the theater version, PGC #2 is reproduced. As shown in FIG. 14, PGC #2 includes VOBs #1, #3, and #4 to be reproduced in sequence. Here, English voice, Japanese voice, English subtitle, and Japanese subtitle are allowed to be reproduced. If the user presses AUDIO SWITCH key during the reproduction of the theater version, the channels for the above audio and sub-picture data permitted are selected in sequence (FIGS. 27 and 28). Such a construction with the audio CH table and the SPCH table enables a proper reproduction of audio and sub-picture data when a plurality of PGCs share VOBs having different numbers of audio physical channels and sub-picture physical channels.

<Second Operation>

The following is description of the operation for switching audio and sub-picture channels when the title menu is temporarily called during the reproduction of the movie A TV on-air version and then the TV on-air version is resumed. Here, the title menu is called if the user presses MENU key on the remote controller and the TV on-air version is resumed if the user presses MENU key again.

FIG. 29A shows VOB #5 which is used for the title menu. VOB #5 is comprised of a plurality of VOBUs, namely, VOBU 5001, VOBU 5002, . . . Each of the VOBUs includes a video pack, an audio pack, a sub-picture pack, and a management pack. The video packs store the moving picture data which represent the background of the menu image and are called video 5001, video 5002, . . . The audio packs store audio data which represent the background music of the menu image and are called audio D 5001, audio D 5002, . . . The sub-picture packs store sub-picture data which represent the menu image and are called SP E 5001, SP E 5002, . . . The management packs are called management pack 5001, management pack 5002, . . . Suppose the audio physical channel number (audio ID) for the background music is "3" and that the sub-picture physical channel number (sub-picture ID) for the menu image is "5."

Figure 29B:
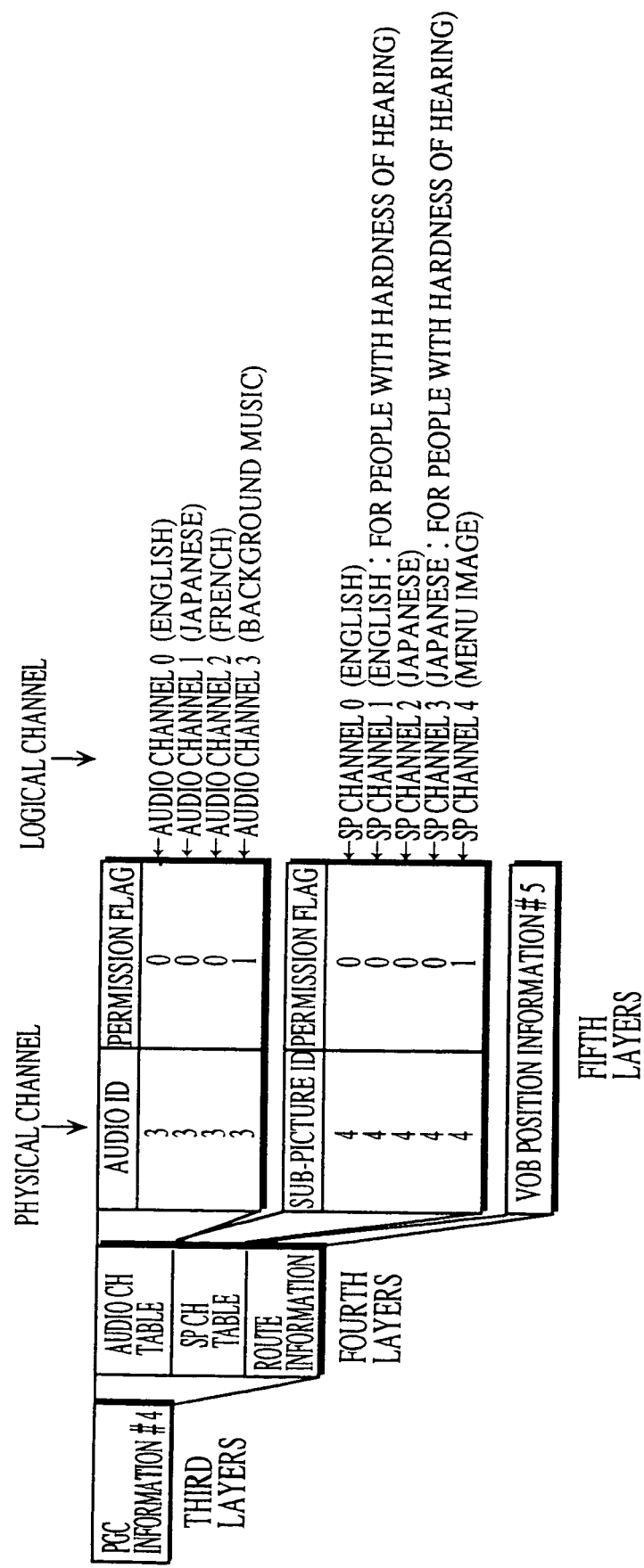
FIG. 29B shows the PGC information used for the title menu.

FIG. 29B shows PGC information #4 which is used for the above title menu. PGC information #4 is recorded in the Video Title Set in which PGC information #1 -#3 for movie A shown in FIG. 15 are also recorded.

The route information of FIG. 29B shows that PGC #4 is comprised of only VOB #5. The audio CH table is set so that all the audio logical channels correspond to the audio physical channel for the background music (audio ID is 3). The sub-picture CH table is set so that all the sub-picture logical channels correspond to the sub-picture physical channel for the menu image (sub-picture ID is 5).

Figure 30:
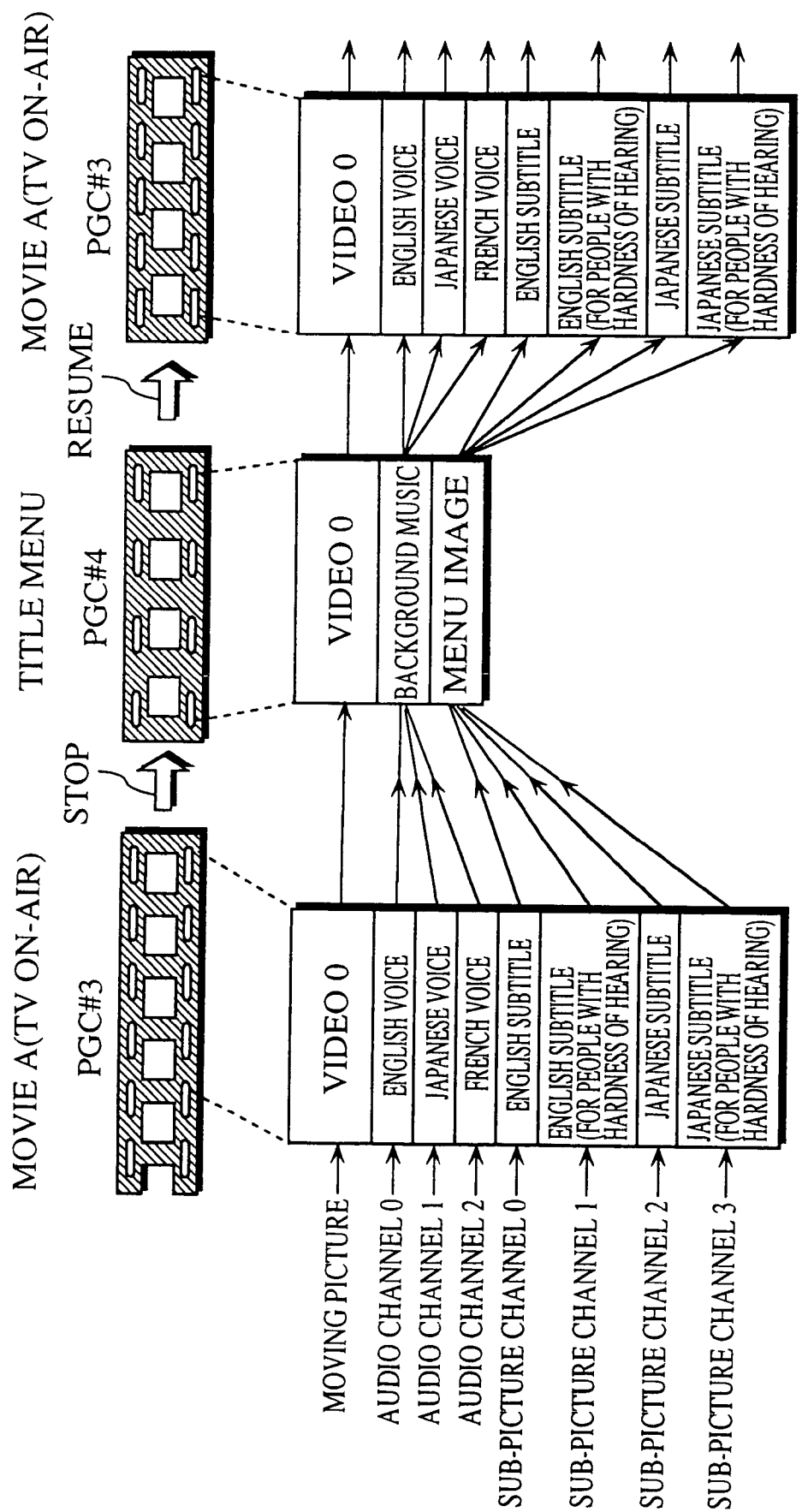
FIG. 30 shows an operation in which the reproduction of a movie is stopped temporarily to call the title menu then resumed.

If the user presses MENU key while the user watches the movie A TV on-air version, as shown in FIG. 30, the disc reproduction apparatus temporarily stops reproducing the TV on-air version and starts reproducing the title menu. With the reproduction of the title menu, the background music for the title menu is reproduced, whatever the audio channel reproduced in the TV on-air version. This is defined in the audio CH table as shown in FIG. 29B (flowchart of FIG. 27). Also, with the reproduction of the title menu, the menu image is reproduced, whatever the sub-picture channel reproduced in the TV on-air version. This is defined in the SPCH table as shown in FIG. 29B (flowchart of FIG. 28).

If the voice or subtitle is changed by the user operation in the title menu, the audio or sub-picture logical channel stored in register R8 or R9 is updated. This is achieved by instruction "SetSTN" as the button command included in the management pack in VOB #5 (see FIGS. 27 and 28).

The disc reproduction apparatus resumes reproduction of movie A if MENU key is pressed during the reproduction of the title menu. Here, movie A is reproduced with the audio and sub-picture physical channels which correspond to the audio and sub-picture logical channels stored in registers R8 and R9 (see FIGS. 27 and 28).

In this way, movie A is resumed with the audio and sub-picture physical channels which reflect the user operation on the logical channels in the title menu. If the user does not change the logical channels, movie A is resumed with the same physical channels as those before the pause. This is possible since the audio and sub-picture logical channels are respectively stored in registers R8 and R9.

As is apparent from the above description, it is possible for the present disc reproduction apparatus to properly reproduce the audio and sub-picture physical channels for each PGC when a plurality of PGCs with different numbers of audio and sub-picture logical channels are reproduced in sequence.

The present embodiment shows an example in which the audio or sub-picture logical channel is changed in the title menu called during the reproduction of movie A. However, the audio or sub-picture logical channel may be changed in a menu represented by the sub-picture data. In an interactive movie, for example, a menu image by sub-picture data is displayed at every screen from which the reproduction branches to another. The menu image may be used for the user to change the audio or sub-picture logical channel.

<Third Operation>

Figure 31:
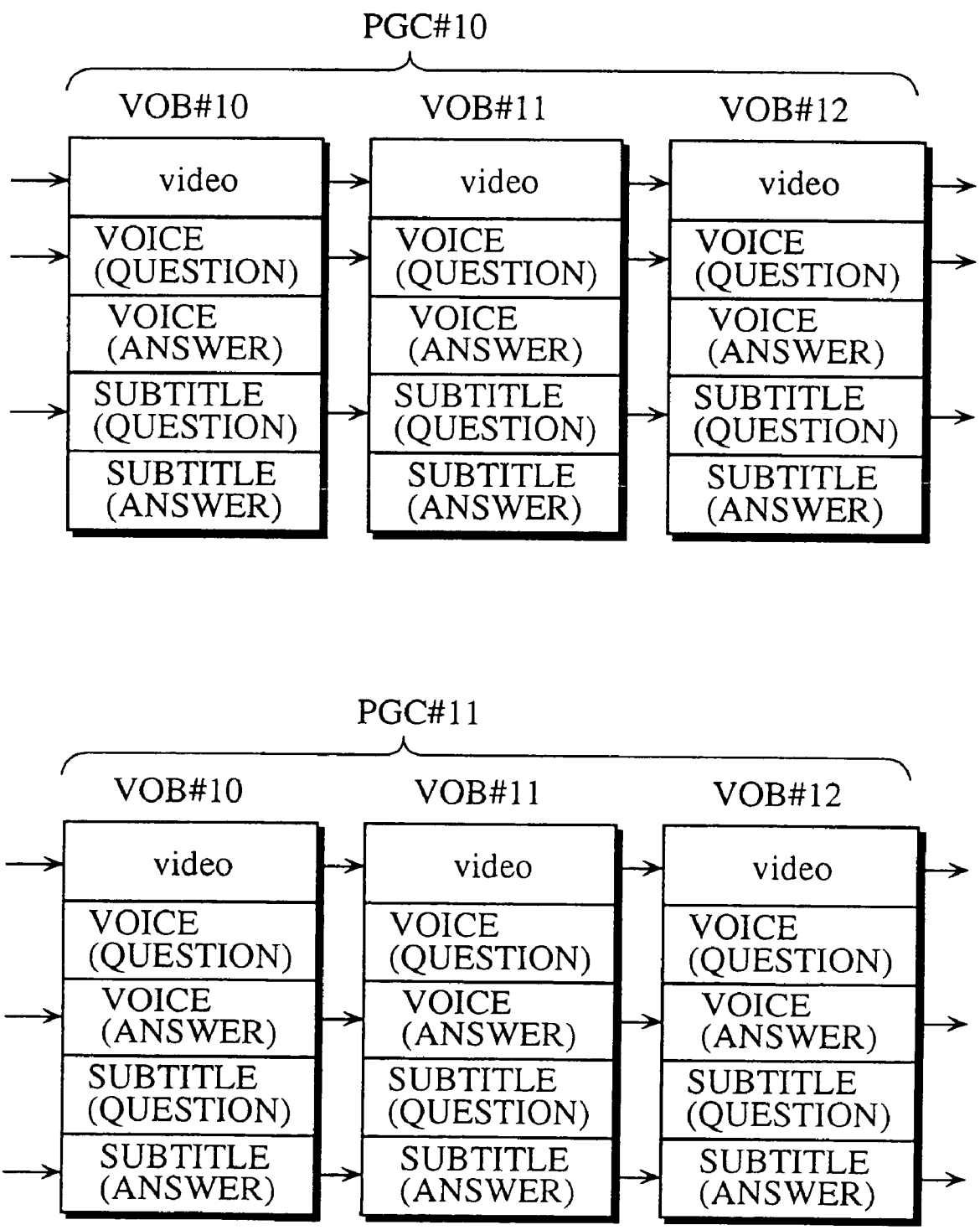
FIG. 31 shows PGCs for English conversation materials.

FIG. 31 shows PGCs #10 and #11. Each of PGCs #10 and #11 is comprised of VOBs #10-#12. Each of the VOBs includes moving picture data of scenes used for the English conversation lesson, audio logical channels of a question and an answer, and sub-picture logical channels of the question and the answer. The audio logical channel of the question (audio ID=0) includes a voice giving a question to the user. The audio logical channel of the answer (audio ID=1) includes a voice giving the question and the answer to the user. The sub-picture logical channel of the question (sub-picture ID=0) includes a subtitle of this question. The sub-picture logical channel of the answer (sub-picture ID=1) includes a subtitle of the question and the answer.

Figure 32:
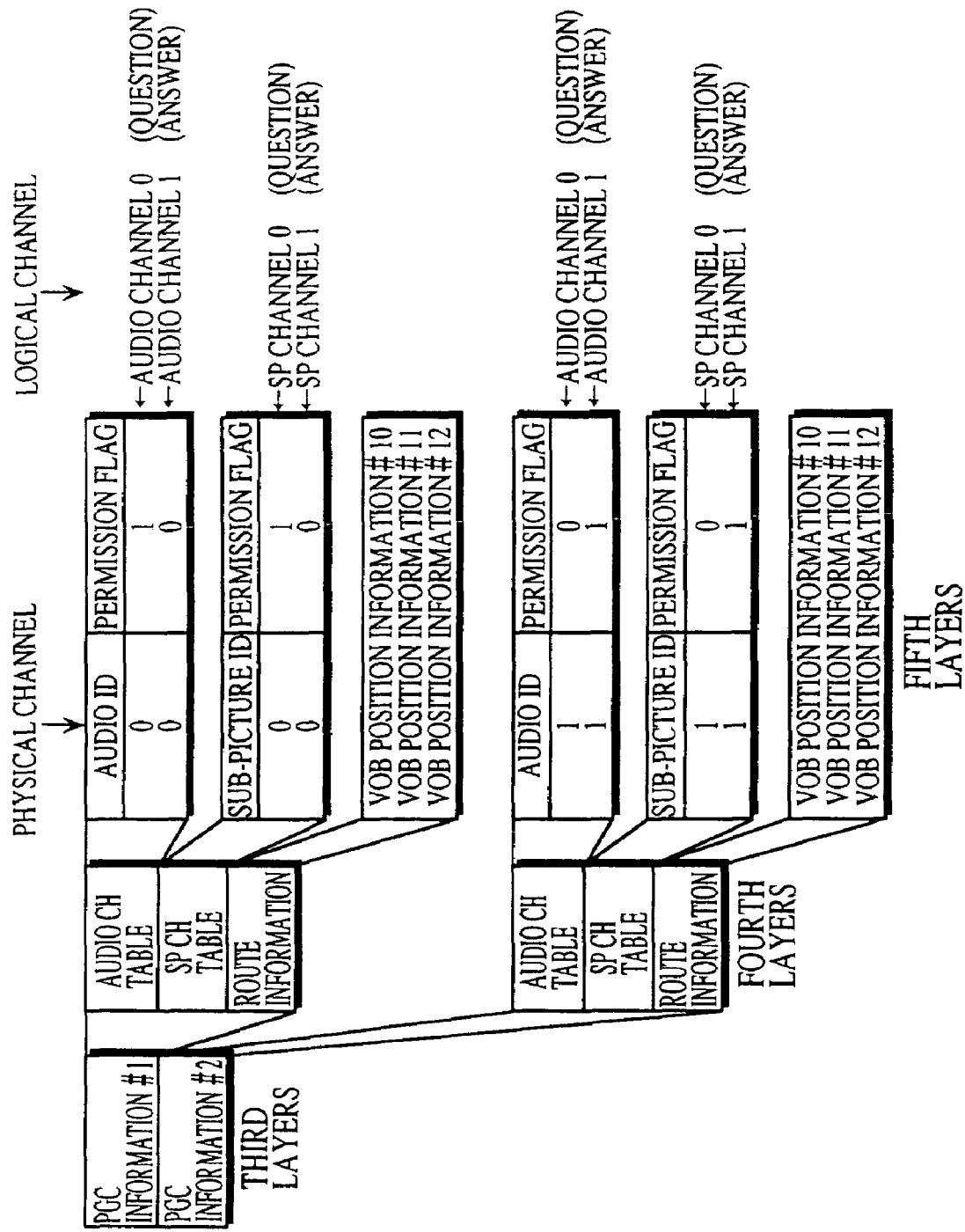
FIG. 32 shows the PGC information of the PGCs for English conversation materials.

FIG. 32 shows PGC information #10 and #11 which respectively correspond to PGCs #10 and #11. The route information of each piece of the PGC information includes the VOB position information for VOBs #10-#11.

In the audio CH table of PGC information #10, audio logical channels 0 and 1 correspond to audio ID 0 and only audio logical channel 0 is permitted to be reproduced (permission flag=1). In the sub-picture CH table of PGC information #10, sub-picture logical channels 0 and 1 correspond to sub-picture ID 0 and only sub-picture logical channel 0 is permitted to be reproduced (permission flag=1). With such settings, only the audio logical channel and the sub-picture logical channel of the question are reproduced in PGC #10.

In contrast to the above, only the audio logical channel (audio ID=1) and the sub-picture logical channel (sub-picture ID=1) of the answer are reproduced in PGC #11.

PGC #10 may be used by students, PGC #11 by teachers. It is also possible to assign PGCs to different stages of study so that the user can change the PGCs as he/she advances. It is also possible for the answers to include only answers. With this construction, it is also possible to define the reproduction route so that the teachers can reproduce both questions and answers and that the students are limited to the reproduction of questions.

As is apparent from the above description, it is possible to specify the audio and sub-picture logical channels which should be permitted to be reproduced for each VOB of each PGC when each VOB includes a plurality of audio and sub-picture logical channels.

Note that in the present embodiment, the audio CH table and the SPCH table are not fully explained for the sake of convenience. The audio CH table includes eight audio logical channels 0-7 and the SPCH table includes 32 sub-picture logical channels 0-31. In these tables, the logical channels other than the logical channels described above have a flag of "not permitted."

<Effects>

As apparent from the above description, the present optical disc and the disc reproduction apparatus enable the title creators to specify the audio and sub-picture logical channels which should be permitted to be reproduced for each PGC when a plurality of PGCs share VOBs.

The user can switch from one audio logical channel to another or from one sub-picture logical channel to another in permitted areas of PGCs or VOBs if the channels are permitted to be reproduced. This prevents malfunctions in which audio/sub-picture logical channels are switched to those not permitted to be reproduced or not assigned to the VOBs.

It is also possible for the present optical disc and the disc reproduction apparatus to properly reproduce the audio and sub-picture physical channels for each PGC when a plurality of PGCs with different numbers of audio and sub-picture logical channels are reproduced in sequence since the audio/sub-picture logical channel numbers specified by the user are related to physical channels by the audio CH and SPCH tables.

In the above embodiments, AUDIO SWITCH key, SP SWITCH key, or MENU key of the remote controller is used to switch the audio/sub-picture logical channel. However, keys on the keyboard may be used instead.

In the above embodiments, the audio/sub-picture logical channel with permission is switched in cyclical sequence each time an input of AUDIO SWITCH key or SP SWITCH key is received. However, the channel number may be specified directly with the use of ten keys. In this case, at steps 274 and 284 of FIGS. 27 and 28, numerals specified by ten keys will be written into the registers as i and j respectively.

In the above embodiments, DVD is used as the optical disc. However, any types of optical discs may be used as far as the discs can store a large amount of digital moving picture data. Also, the same effects can be achieved by using rewritable discs instead of read only discs.

In the above embodiments, the digital moving picture data under MPEG2 is used for the moving picture data. However, other kinds of moving picture data such as the digital moving picture data under MPEG1 and the digital moving picture data with a conversion algorithm other than DCT (Discrete Cosine Transform) under MPEG may be used as far as the moving picture data can form the multimedia data with the audio data and the sub-picture data.

In the above embodiments, the management pack is assigned for each GOP, which is the unit of reproducing moving picture data. However, the management pack may be assigned for each unit of reproducing moving picture data if another compression method is used to compress the digital moving picture data.

In the above embodiments, the management pack including Highlight Information is assigned for each VOBU, which is a synchronization unit of around 0.5 to 1.0 seconds in reproducing moving picture data. However, the management pack may be assigned in smaller units of image frames having, for example, time periods of around 1/30 seconds.

<Optical Disc Production Method>

Now, a method for producing an optical disc used in the embodiments is described.

FIG. 33 is a flowchart showing the procedure of producing the optical disc used in the embodiments.

The volume area data as shown in FIG. 2 is created by using a logical data sequence creation apparatus (step 191). The logical data sequence creation apparatus creates such volume area data on a personal computer or a workstation with the use of an editing software title. The volume area data is recorded in a medium such as magnetic tape, then converted into physical data sequence by a physical data sequence creation apparatus (step 192). The lead-in area data and lead-out area data are added to the volume area data. Error Correction Codes (ECCs) are then added to the combined data to generate the physical data sequence. The master optical disc in which the physical data sequence is recorded is created with the use of a master disc cutting apparatus (step 193). Copies of the master optical disc are then manufactured by using a pressing machine (step 194).

Conventional CD manufacturing machines may be used for manufacturing the above-constructed optical disc except a part of the logical data sequence creation apparatus related to the data construction of the present invention. Concerning this point, please refer to Heitaro Nakajima and Hiroji Ogawa: Compact Disc Dokuhon, Ohmu Ltd. and Applied Physics Society Optics Meeting: Optical Disc System, Asakura Shoten.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A reproduction apparatus for reproducing video data in which a piece of moving picture data and a plurality of pieces of sub-data are interleaved, the plurality of pieces of sub-data being reproduced selectively and synchronized with the piece of moving picture data, each piece of sub-data being assigned with an ID, the reproduction apparatus comprising:
   a holding unit configured to hold a table that shows correspondence between (i) route information specifying a combination of pieces of video data to be reproduced sequentially, (ii) logical numbers of sub-data, (iii) IDs of sub-data, and (iv) the pieces of video data specified by the route information;
   a determining unit configured to determine, based on the table and a predetermined logical number, a piece of sub-data to be reproduced;
   a reproducing unit configured to reproduce moving picture data included in the pieces of video data in accordance with the route information, together with the piece of sub-data determined by the determining unit; and
   a receiving unit configured to receive an instruction input by a user and change the predetermined logical number cyclically in accordance with the received instruction.

2. The reproduction apparatus of claim 1, wherein
   the user inputs the instruction by depressing a key provided in an operation panel attached to the reproduction apparatus.

3. The reproduction apparatus of claim 1, wherein
   the user inputs the instruction by depressing a key provided in an operation panel of a remote controller for the reproduction apparatus.

4. The reproduction apparatus of claim 1, wherein
   the table includes a flag for each of the logical numbers, the flag indicating whether a corresponding logical number is effective or ineffective, wherein
   the receiving unit refers to the table and skips ineffective logical numbers while cyclically changing the predetermined logical number.

* * * * *